US005719867A

United States Patent [19]
Borazjani

[11] Patent Number: 5,719,867
[45] Date of Patent: Feb. 17, 1998

[54] PLURAL TELEPHONY CHANNEL BASEBAND SIGNAL DEMODULATOR FOR A BROADBAND COMMUNICATIONS SYSTEM

[75] Inventor: Ramin Borazjani, Lawrenceville, Ga.

[73] Assignee: Scientific-Atlanta, Inc., Norcross, Ga.

[21] Appl. No.: 497,555

[22] Filed: Jun. 30, 1995

[51] Int. Cl.[6] .................................................. H04H 1/08
[52] U.S. Cl. ........................... 370/436; 370/442; 348/6; 348/11
[58] Field of Search .................................. 370/329, 330, 370/336, 337, 341, 345, 347, 436, 437, 442, 465–467, 478, 498, 485; 348/6, 10, 11, 13, 14; 455/3.1

[56] References Cited

U.S. PATENT DOCUMENTS

| | | | |
|---|---|---|---|
| 3,992,589 | 11/1976 | Kuegler | 370/481 |
| 4,709,418 | 11/1987 | Fox et al. | 455/418 |
| 4,742,512 | 5/1988 | Akashi et al. | 370/347 |
| 4,763,317 | 8/1988 | Lehman et al. | 370/358 |
| 4,849,811 | 7/1989 | Kleinerman | 358/133 |
| 5,029,333 | 7/1991 | Graves et al. | 370/490 |
| 5,084,903 | 1/1992 | McNamara et al. | 375/290 |
| 5,088,111 | 2/1992 | MaNamara et al. | 375/290 |
| 5,125,100 | 6/1992 | Katnelson | 455/6.1 |
| 5,140,613 | 8/1992 | Birgenheier et al. | 375/308 |
| 5,153,763 | 10/1992 | Pidgeon | 359/125 |
| 5,247,347 | 9/1993 | Litteral et al. | 348/7 |
| 5,249,205 | 9/1993 | Chennakeshu et al. | 375/348 |
| 5,303,229 | 4/1994 | Withers et al. | 370/490 |
| 5,343,240 | 8/1994 | Yu | 348/14 |
| 5,347,304 | 9/1994 | Moura et al. | 348/12 |
| 5,351,234 | 9/1994 | Beierle et al. | 370/307 |
| 5,376,894 | 12/1994 | Petranovich | 329/306 |
| 5,400,368 | 3/1995 | Cheng et al. | 375/354 |
| 5,412,352 | 5/1995 | Graham | 332/103 |
| 5,440,335 | 8/1995 | Beveridge | 348/15 |
| 5,469,495 | 11/1995 | Beveridge | 379/56 |
| 5,581,555 | 12/1996 | Dubberly | 370/487 |

FOREIGN PATENT DOCUMENTS

WO 93/06669  4/1993  WIPO.
WO 94/28665  12/1994  WIPO.
WO 95/27348  10/1995  WIPO.

OTHER PUBLICATIONS

Large, David; *Creating a Network for Interactivity*, IEEE Spectrum (Apr. 1995), pp. 58–63.

Mueller, Kurt H. and Müller, Markus; *Timing Recovery in Digital Synchronous Data Receivers*, IEEE Transactions on Communications, vol. COM–24, No. 5 (May 1976), pp. 516–530.

Kurth, Carl F., "SSB/FDM Utilizing TDM Digital Filters", *IEEE Transactions on Communication Technology*, Feb. 1971, pp. 63–71.

(List continued on next page.)

*Primary Examiner*—Douglas W. Olms
*Assistant Examiner*—Ricky Ngo
*Attorney, Agent, or Firm*—Kenneth M. Massaroni; John Victor Pezdek; Frederick W. Powers, III

[57] ABSTRACT

A communication system for coupling telephony or other digital networks to a broadband network such as a CATV network. The system transmits a multiplex of telephony signals in the forward band of the broadband network, with individual signals directed to an addressed subscriber. Telephony signals returning from subscribers are modulated onto the reverse band of the broadband network in a frequency division multiplex (FDM). The modulated telephony signals are received at a telephony network interface coupled to the broadband network. A selected plurality of modulated telephony signals are frequency shifted to baseband. The baseband-shifted telephony signals are sampled to generate a plurality of time division multiple access telephony signal samples. A plurality of time division multiple access telephony signal samples are channelized into a serial data stream with a channelizer. The serial data stream is processed with a single digital signal processor (DSP) to derive a plurality of demodulated telephony signals. The demodulated telephony signals are coupled to the telephony network.

23 Claims, 17 Drawing Sheets

OTHER PUBLICATIONS

Freeny, Stanley L., et al., "Design of Digital Filters for an All Digital Frequency Division Multiplex–Time Division Multiplex Translator", *IEEE Transactions on Circuit Theory*, Nov. 1971, pp. 702–711.

Freeny, Stanley L., et al., "Systems Analysis of a TDM–FDM Translator/Digital A–Type Channel Bank", *IEEE Transactions on Communication Technology*, Dec. 1971, pp. 1050–1059.

Bellanger, Maurice G., "TDM–FDM Transmultiplexer: Digital Polyphase and FFT", *IEEE Transactions on Communications*, Sep. 1974, pp. 1199–1205.

Crochiere, Ronald E. and Rabiner, Lawrence R., "Weighted Overlap—Add Structures for Efficient Realization of DFT Filter Banks", *Multirate Digital Signal Processing*, Prentice Hall, 1983, Sec. 7.2.5, pp. 313–326.

Harris, Frederic J., "Time Dmain Signal Processing with the DFT", *Handbook of Digital Signal Processing Engineering Applications*, Academic Press, 1987, Chapter 8, pp. 633–666.

SPECTRAL ALLOCATION - ALTERNATIVE EMBODIMENT

FORMATION OF BASEBAND DS0 CHANNELS (QPSK UPSTREAM AT 49.5 KHz CARRIER INCREMENTS)

INPUT TELEPHONY-TO-CATV NETWORK INTERFACE

OUTPUT TELEPHONY-TO-CATV NETWORK INTERFACE

TELEPHONY TERMINAL OR CUSTOMER INTERFACE UNIT

REVERSE PATH DEMODULATOR (REV DEMOD)

AGC - INPUT MULTIPLICATION

AGC - AMPLITUDE DETECTION AND FILTERING

VARIABLE GROUP DELAY FILTER

DELAY INSERTION, VARIABLE GROUP DELAY FILTER, AND DOWNSAMPLING

SYMBOL TIMING RECOVERY (STR)

BASEBAND PHASE ROTATOR (BPR)

PHASE LOCK LOOP AND
CARRIER PHASE LOCK (CPL) DETECTION

| SYMBOL CLOCK | OPERATION DESCRIPTION |
|---|---|
| n=1...10 | EXPONENT DETECTION |
| n=11 | SHIFTER OUTPUTS 2 SAMPLES PER I OR Q<br>MULTIPLIER OUTPUTS 2 VALUES PER I OR Q<br>VARIABLE GROUP DELAY FILTER OUTPUTS 1 VALUE PER I OR Q<br>BPR OUTPUTS 1 VALUE PER I OR Q<br>PHASE LOCK LOOP OUTPUTS 1 PI VALUE<br>STR STARTS AVERAGING BY ACCUMULATING THE ERROR<br>    VALUES AT OUTPUT OF CORRELATOR<br>DECODE AND FORMAT BLOCK OUTPUTS ONE 3 BIT WORD |
| n=12...15 | REPEAT n=11 OPERATION 4 TIMES |
| n=16 | SHIFTER OUTPUTS 2 SAMPLES PER I OR Q<br>MULTIPLIER OUTPUTS 2 VALUES PER I OR Q<br>VARIABLE GROUP DELAY FILTERS OUTPUTS 1 VALUE PER I OR Q<br>BPR OUTPUTS 1 VALUE PER I OR Q<br>PHASE LOCK LOOP OUTPUTS 1 PI VALUE<br>STR OUTPUTS COEFFICIENT b AND SAMPLE SELECT<br>    VALUES FOR VARIABLE GROUP DELAY FILTER<br>    (IIR FILTERING AND SAMPLE SELECT LOGIC)<br>DECODE AND FORMAT BLOCK OUTPUTS ONE 3 BIT WORD |
| n=17 | SHIFTER OUTPUTS 2 SAMPLES PER I OR Q<br>MULTIPLIER OUTPUTS 2 VALUES PER I OR Q<br>VARIABLE GROUP DELAY FILTERS OUTPUTS 1 VALUE PER I OR Q<br>BPR OUTPUTS 1 VALUE PER I OR Q<br>PHASE LOCK LOOP OUTPUTS 1 PI VALUE<br>AGC STARTS AVERAGING BY ACCUMULATING THE AMPLITUDE<br>    ERROR VALUES<br>DECODE AND FORMAT BLOCK OUTPUTS ONE 3 BIT WORD |
| n=18, 19 | REPEAT n=17 OPERATIONS 3 TIMES |
| n=20 | SHIFTER OUTPUTS 2 SAMPLES PER I OR Q<br>MULTIPLIER OUTPUTS 2 VALUES PER I OR Q<br>VARIABLE GROUP DELAY FILTER OUTPUTS 1 VALUE PER I OR Q<br>BPR OUTPUTS 1 VALUE PER I OR Q<br>PHASE LOCK LOOP OUTPUTS 1 PI VALUE<br>AGC OUTPUTS THE MULTIPLICATION FACTOR M FOR THE<br>    INPUT MULTIPLIER (IIR FILTERING AND SATURATION)<br>DECODE AND FORMAT BLOCK OUTPUTS ONE 3 BIT WORD |
| SUBSEQUENT OPERATIONS | REPEAT (n=11 TO n=20 OPERATIONS) |

*FIG. 18*

PLURAL TELEPHONY CHANNEL BASEBAND SIGNAL DEMODULATOR FOR A BROADBAND COMMUNICATIONS SYSTEM

FIELD OF THE INVENTION

The present invention pertains generally to communicating telephony signals, and other or similar signals, over CATV and equivalent networks, and is more particularly related to processing of telephony signals transmitted in the reverse path of a CATV network.

CROSS REFERENCE TO RELATED APPLICATIONS

This application is related to application Ser. No. 08/219,848, filed Mar. 30, 1994, entitled "Frequency Agile Broadband Communications System", now U.S. Pat. No. 5,594,726, which is a continuation-in-part of application Ser. No. 08/123,363, filed Sep. 17, 1993, entitled "Broadband Communications System", now U.S. Pat. No. 5,499,241, the disclosures of which are incorporated herein by reference and made a part hereof.

BACKGROUND OF THE INVENTION

In order to introduce the present invention and the problems that it solves, it is useful to overview a conventional CATV broadband communication system, and then examine certain prior approaches to problems encountered when attempting to introduce telephony signals into the broadband environment.

CONVENTIONAL CABLE TELEVISION SYSTEMS (CATV)

Cable television systems, sometimes referred to as community-antenna television (CATV) systems, are broadband communications networks of coaxial cable and optical fiber that distribute television, audio, and data signals to subscriber homes or businesses. In a typical CATV system, a single advantageously located antenna array feeding a cable network supplies each individual subscriber with a usable television signal. It is estimated that CATV networks currently pass approximately 90% of the population in the United States, with approximately 60–65% of all households actually being connected.

A typical CATV system comprises four main elements: a headend, a trunk system, a distribution system, and subscriber drops.

The "headend" is a signal reception and processing center that collects, organizes and distributes signals. The headend receives satellite-delivered video and audio programming, over-the-air broadcast TV station signals, and network feeds delivered by terrestrial microwave and other communication systems. In addition, headends may inject local broadcasting into the package of signals sent to subscribers such as commercials and live programming created in a studio.

The headend contains signal-processing equipment that controls the output level of the signals, regulates the signal-to-noise ratio, and suppresses undesired out-of-band signals. Typical signal-processing equipment includes a heterodyne processor or a demodulator-modulator pair. The headend then modulates received signals onto separate radio frequency (RF) carriers and combines them for transmission over the cable system.

The "trunk system" is the main artery of the CATV network that carries the signals from the headend to a number of distribution points in the community. A modern trunk system typically comprises of a combination of coaxial cable and optical fibers with trunk amplifiers periodically spaced to compensate for attenuation of the signals along the line. Such modern trunk systems utilizing fiber optics and coaxial cable are often referred to as "fiber/coax" systems.

The "distribution systems" utilize a combination of optical fibers and coaxial cable to deliver signals from the trunk system into individual neighborhoods for distribution to subscribers. In order to compensate for various losses and distortions inherent in the transmission of signals along the cable network, line-extender amplifiers are placed at certain intervals along the length of the cable. Each amplifier is given just enough gain to overcome the attenuation loss of the section of the cable that precedes it. A distribution network is also called the "feeder".

There is a strong desire in the CATV and telecommunications industry to push optical fiber as deeply as possible into communities, since optical fiber communications can carry more signals than conventional networks. Due to technological and economic limitations, it has not yet proved feasible to provide fiber to the subscriber's home. Present day "fiber deep" CATV distribution systems including optical fibers and coaxial cable are often called "Fiber-To-the-Serving-Area" or "FTSA" systems.

"Subscriber drops" are taps in the distribution system that feed individual 75Ωcoaxial cable lines into subscribers' television sets or subscriber terminals, often referred to as "subscriber premises equipment" or "customer premises equipment" ("CPE"). Since the tap is the final service point immediately prior to the subscriber premises, channel authorization circuitry is often placed in the tap to control access to scrambled or premium programming.

Cable distribution systems were originally designed to distribute television and radio signals in the "downstream" direction only (i.e., from a central headend location to multiple subscriber locations, also referred to as the "forward" path). Therefore, the component equipment of many older cable systems, which includes amplifiers and compensation networks, is typically adapted to deliver signals in the forward direction only. For downstream transmissions, typical CATV systems provide a series of video channels, each 6 MHz in bandwidth, which are frequency division multiplexed across the forward band, in the 50 MHz to 550 MHz region of the frequency spectrum. As fiber is moved more deeply into the serving areas in fiber/coax and FTSA configurations, the bandwidth of the coax portion is expected to increase to over 1 GHz.

The advent of pay-per-view services and other interactive television applications has fueled the development of bidirectional or "two-way" cable systems that also provide for the transmission of signals from the subscriber locations back to the headend. This is often referred to as the "upstream" direction or the "reverse" path. This technology has allowed cable operators to provide many new interactive subscriber services on the network, such as impulse-pay-per-view (IPPV). In many CATV systems, the band of signals from 5 MHz to 30 MHz is used for reverse path signals.

However, the topology of a typical CATV system, which looks like a "tree and branch" with the headend at the base and branching outwardly to the subscriber's, creates technical difficulties in transmitting signals in the upstream direction back to the headend. In the traditional tree and branch cable network, a common set of downstream signals are distributed to every subscriber home in the network. Upstream signals flowing from a single subscriber toward the headend pass by all the other upstream subscriber homes on the segment of distribution cable that serves the neighborhood.

The standard tree and branch topology has not proven to be well suited for sending signals from each subscriber location back to the headend, as is required for bidirectional communication services. Tree and branch cable distribution systems are the most efficient in terms of cable and distribution usage when signals have to be distributed in only the downstream direction. A cable distribution system is generally a very noisy environment, especially in the reverse path. Interfering signals may originate from a number of common sources, such as airplanes passing overhead or from Citizens Band (CB) radios that operate at a common frequency of 27 MHz, which is within the typical reverse channel bandwidth of CATV networks. Since the reverse direction of a tree and branch configuration appears as an inverted tree, noise is propagated from multiple distribution points to a single point, the headend. Therefore, all of the individual noise contributions collectively add together to produce a very noisy environment and a communications problem at the headend.

Present day FTSA systems facilitate the communication of signals in the reverse direction by dividing the subscriber base of a cable network into manageable serving areas of approximately 400–2500 subscribers. This allows for the reuse of limited reverse band frequency ranges for smaller groups of subscribers. The headend serves as the central hub of a star configuration to which each serving area is coupled by an optical communications path ending in a fiber node. The fiber node is connected to the serving area subscribers over a coaxial cable distribution sub-network of feeders and drops in each serving area. In the FTSA configuration, some of the signals in the forward direction (e.g., television program signals) are identical for each serving area so that the same subscriber service is provided to all subscribers. In the reverse direction, the configuration provides an independent spectrum of frequencies confined to the particular serving area. The FTSA architecture thus provides the advantage of multiplying the bandwidth of the reverse portions of the frequency spectrum times the number of serving areas.

The Desire for Telephony Service

The ever-expanding deployment of fiber optic technology in CATV systems across the country has cable operators looking to provide a whole new range of interactive services on the cable network. One area that is of particular interest is telephony service. Because of recent advances in technology as well as the loosening of regulations, the once distinct lines between the cable television network and the telephone network have blurred considerably. Currently there is a great demand for a broadband communication system that can efficiently provide telephone service over the existing cable distribution network.

Moreover, there is substantial interest expressed by telephone system operating companies in the idea of increased bandwidth for provision of new services to telephone subscribers, such as television; interactive computing, shopping, and entertainment; videoconferencing, etc. Present day "copper" based telephony service (so called because of the use of copper wires for telephone lines) is very bandwidth limited—about 3 kHz—and cannot provide for such enhanced services by the telephone companies without massive changes to the telephone networks infrastructure.

Existing communications systems, however, have not proven to be well suited for the transmission of telephony signals on the cable network. A system for transmitting telephony signals must be configured to allow single point to single point distribution (i.e., from a single subscriber to a single subscriber). However, unlike the telephone companies with their well-established national two-way networks, the cable industry is fragmented into thousands of individual systems that are generally incapable of communicating with one another. The cable network is instead ideally configured for single point to multiple point signal transmission (i.e., from a single headend downstream to multiple subscriber locations).

Moreover, CATV systems do not have the switching capabilities necessary to provide point to point communications. A communications system for the transmission of telephone signals must therefore be compatible with the public switched telephone networks ("PSTN") operated by the telephone operating companies. To be useful in the carriage of telephony signals, a CATV network must be able to seamlessly interface to a telephony network at a point where it is commercially viable to carry telephony signals. It must also provide signals that can pass to other parts of the interconnected telephone systems without extensive modulation or protocol changes to thereby become part of the international telephone system.

Telephony on Broadband Network

One approach taken to provide a bidirectional broadband communications system is shown in the above-referenced related U.S. patents which are owned by the assignee of the present invention. These patents describe broadband communication systems that utilize two different modulation schemes for communicating information between a central headend and a plurality of subscriber nodes. For downstream communications from the headend, telephony signals are transmitted in a plurality of 3 MHz bandwidth channels utilizing QPR modulation, with each 3 MHz band carrying the equivalent of 96 DS0 telephony channels. For upstream communications, one system uses a frequency-agile quadrature phase shift keyed (QPSK) modulation scheme that transmits each subscriber's outgoing DS0 telephony channel in one of 480 separate 49.5 kHz bands in the 5–30 MHz reverse band.

Telephony signals that are carried on the broadband network are coupled to the telephony network at various points, such as the headend unit (HIU) or at separate network interface connection points. In a distributed architecture where a limited number of telephony signals are carried in the broadband domain, it is important that the telephony network interface be inexpensive, compact, and structurally simple. Nonetheless, each network interface should be structured so as to provide connection to the telephony network in a customarily accepted format such as in DS1 or T1, DS2, SONET, or similar multiple telephony channel formats.

The need for efficient signal processing of the upstream telephony channels is most acute in the upstream channel, since a given voice channel originating with a subscriber can appear anywhere in the 5–30 MHz spectrum, at different frequencies at different times, as a result of the operation of the frequency reassignment scheme used when the communication environment becomes noisy. Although processing the signals in the digital domain would be preferable from an implementation and hardware standpoint, with present day technologies it is not cost-effective to handle the QPSK signal digitally at the carrier frequency. On the other hand, if the telephony channel could be converted to the relatively low frequency baseband (such as approximately 50 kHz for QPSK), then it is possible for plural DS0s to be handled by a single digital signal processor.

Therefore, there is a need for a broadband communications system that is compatible with the existing public switched telephone networks and that is not sensitive to noise or other interference issues, particularly in the reverse path.

There is also a need for a broadband communications system that is bandwidth efficient and provides a higher spectral efficiency than present systems, thereby increasing the number of subscribers that may be served by each broadband network with telephony and enhanced services offered by CATV system operators, telephone company operating companies, and others.

There is also a need for a telephony network/broadband communication network interface that allows handling of plural telephony channels in an upstream communication path in an efficient and cost-effective manner.

There is also a need for a digital signal processing scheme that allows the processing power of a digital signal processor to operate upon plural telephony channels, which are typically bandwidth limited to about 8 kHz, to obtain a savings in density, cost and space.

There is also a need for a broadband communication system telephony system network interface that allows efficient retrieval of plural telephony channels assigned to predetermined and variable frequency assignments because of frequency agile operation, that efficiently collects and multiplexes plural telephony channels into a predetermined telephony signal format for communication on the telephony network.

That the present invention achieves these objects and fulfills the needs described hereinabove will be appreciated from the detailed description to follow and the appended drawings.

SUMMARY OF THE INVENTION

The invention includes methods and apparatus for providing broadband communications, including bidirectional telephony communications, over a cable distribution network. In particular, the present invention provides an integrated CATV/telephony system that is compatible with today's public switched telephone networks and can also deliver video, data, security monitoring, and other services without affecting current in-home wiring or equipment.

Briefly described, the present invention provides a system for coupling telephony signals communicated from a subscriber via a broadband communication network to a telephony network interface. An analog front end comprising a plurality of frequency converter circuits is provided for downconverting the center frequency of a given bandwidth comprised of a predetermined number n of DS0 channels to DC. A channelizer is provided for taking a composite of the predetermined number n DS0 channels in a given band and producing n baseband DS0 channels. The channelizer provides serial data corresponding to time division multiple access (TDMA) sampled signals corresponding to the modulated telephony signals at baseband. A baseband demodulator constructed from a single digital signal processor (DSP) is provided for demodulating the TDMA sampled signals and deriving demodulated telephony signals. The demodulated telephony signals are coupled to the telephony network an output interface such as a headend or separate telephony network interface.

More particularly described, the present invention provides an improved, multi-DS0 channel baseband processing demodulator that can process a plurality (six in the disclosed embodiment) baseband DS0 channels with a single DSP. The system including the DSP includes an input port for receiving a serial data stream comprising a plurality of digital signal samples representing a plurality of QPSK-modulated DS0 telephony channels at baseband. The processing stages effected in the DSP include an automatic gain control (AGC) stage for adjusting the gain of the digital signal samples for each of the independent DS0 telephony channels. The DSP also carries out a symbol timing recovery (STR) stage for extracting timing information for each of the QPSK-modulated DS0 telephony channels from the digital signal samples and delaying the sampling of the digital signal samples at a decoding stage to a time such that the sampling will be at optimized symbol instants. Further, the DSP provides a carrier phase recovery stage for locking the demodulator to the frequency of the carrier for each of the QPSK-modulated DS0 telephony signals. Finally, the DSP carries out a symbol decoding and formatting stage for sampling the digital signal samples and providing a digital signal output corresponding to the each of the demodulated DS0 telephony channels.

In the disclosed embodiment, telephony signals are communicated from a telephony network to CATV subscribers in the forward band of the cable network and telephony signals are communicated from the CATV subscribers to the telephony network in the reverse band of the cable network. Further, the subscriber telephony signals to the telephony network are digitized and individually modulated on a carrier in the reverse band of the CATV system. As an illustrated example, a subscriber DS0 telephony line is QPSK modulated into an approximately 50 kHz bandwidth signal (e.g. 49.5 kHz) and frequency division multiplexed on the reverse band of the CATV network. The individual telephony signals are multiplexed into a standard time-division multiplexed (TDM) telephony signal which can be adapted to couple directly into a SONET port or other standard telephony connection, such as a DS1, DS2, or DS3 format signal, of the telephony network.

It is an object of the present invention to provide a flexible, digital design for handling baseband processing of plural DS0 telephony channels in a single programmable digital signal processor, to obtain improvements in density, cost, and space.

Advantageously, by translating a plurality of reverse channel telephony signals to baseband, a single digital signal processor can handle a significant number, six in the preferred embodiment, of DS0 telephony channels. This provides a low cost, compact demodulator that can be used in larger systems where a large number of telephony signals are coupled between the telephony network and the broadband network.

Furthermore, all the mathematical constants (sin and cosine values) required for QPSK demodulation can be stored within the memory of the DSP, providing a very memory-usage efficient demodulator that can handle a number of DS0 channels simultaneously.

Also, handling the AGC, STR, CPR, and symbol decoding functions digitally at the symbol rate rather than in the analog domain or with an oversampling approach results in a compact, efficient, multi-channel demodulator.

By using the reverse band of the CATV network in small increments of about 50 kHz, the flexibility of the reverse signaling band is not compromised. The system operator can still provide interactive TV services, IPPV services, and other reverse path signals while providing telephony service.

These and other objects, features and advantages of the invention will be better understood and more fully appreciated if a reading of the following detailed description is undertaken in conjunction with the appended drawings and claims.

BRIEF DESCRIPTION OF THE DRAWINGS

FIG. 18 is a chart of timing operations for programming the preferred digital signal processor.

DETAILED DESCRIPTION OF THE PREFERRED EMBODIMENTS

Figure 1:
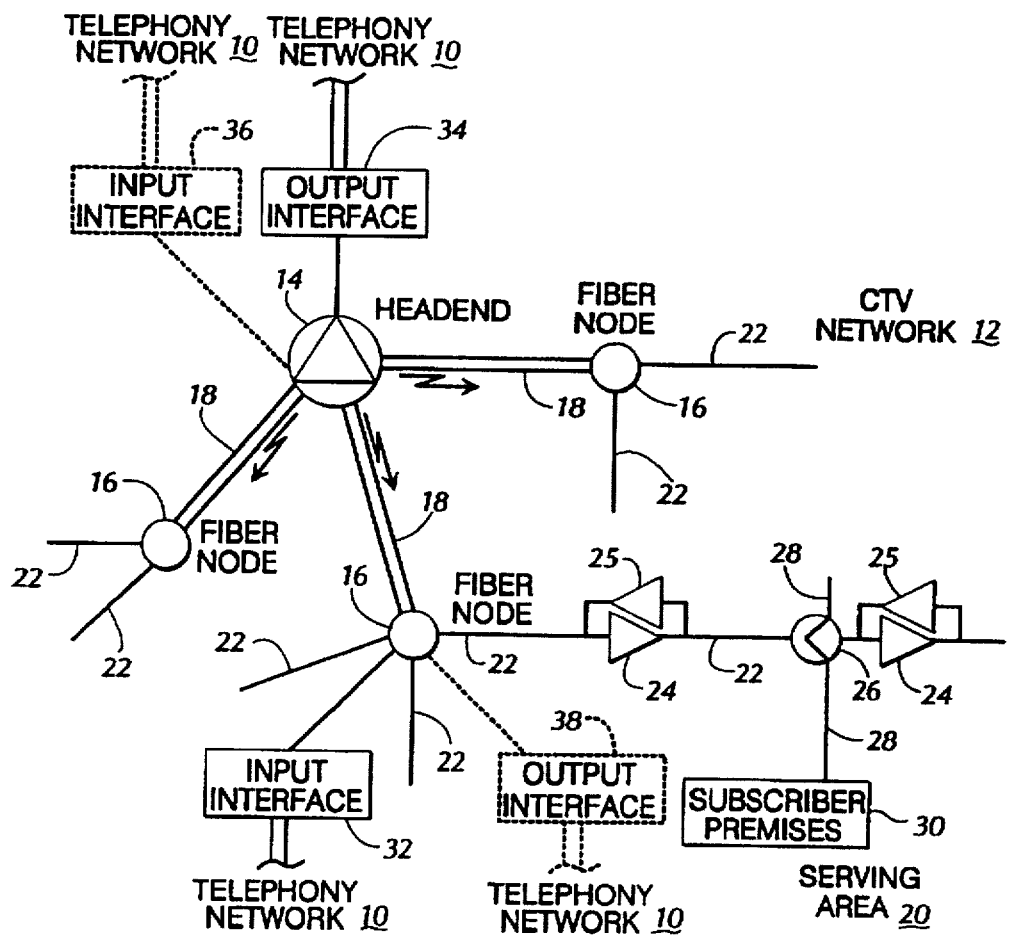
FIG. 1 is a system block diagram of a broadband telephony system in which the invention is utilized.

With respect now to FIG. 1, there is shown a broadband communications system in which the present invention is utilized The system will be described in connection with the communications of telephony signals, but it will be evident that other signals of similar or equivalent types can also be used. Further, while digital telephony signals are described, the system is also capable of communicating analog telephony signals or other types of digital signals. Telephony signals from the telephony network are coupled to the CATV network 12 and are communicated over the CATV network to an addressed subscriber premises 30. The addressed subscriber 30 communicates telephony signals back over the CATV network 12 which are then coupled to the telephony network 10. The system serves as an extension of the telephony network 10 where subscribers can call out to the telephony network 10 or receive calls from the telephony network. This service is in addition to the conventional video, audio, data and other services provided to each subscriber by the CATV network 12.

By "headend", we do not mean to be limited to a conventional coaxial CATV headend such as 14, but also consider that an optical fiber node such as 16 or other communication node that can serve the functions of receiving multiplexed communication signals from a source of signals, such as a telephony central office, and communicating such signals to subscribers in the broadband network. As will be seen in the following discussion, a CATV headend 16 is the preferred embodiment for effecting these functions.

A preferred implementation of the broadband communications system is illustrated in FIG. 1. The system includes the telephony network 10 which interfaces through an input interface 32 to the CATV network 12. The CATV network 12 further interfaces with the telephony network 10 through an output interface 34. Telephony signals are communicated to subscribers of the CATV network 12 through the input interface 32 to a subscriber premises 30. Telephony signals from the subscriber premises 30 of the CATV network 12 are communicated over the CATV network 12 and through the output interface 34 to the telephony network 10. The broadband communications system does no switching and thus takes advantage of the strength of the CATV network 12 for its broadband communications path and the strength of the telephony network 10 for its connection and switching capability.

The CATV network 12 is illustrated as having a fiber to the serving area (FTSA) architecture. A headend 14 provides CATV programming which is distributed via a distribution network to a plurality of subscribers at their subscriber premises 30. The distribution network serves a plurality of "serving areas", such as the one referenced at 20, which are groups of subscribers that are located proximate to one another. Each serving area is comprised of groups ranging in size from about 50 homes to about 2500 homes. The headend 14 is coupled to each serving area in a star configuration through an optical fiber 18 which ends in a fiber node 16. The CATV programming and telephony signals are converted from an RF broadband signal to light modulation at the headend 14, transmitted over the optical fiber 18, and then converted back to an RF broadband signal at the fiber node 16. Radiating from each of the fiber nodes 16 throughout its serving area 20 is a coaxial sub-network of feeders 22 having bidirectional amplifiers 24 and bidirectional line extenders 25 for boosting the signal.

The RF broadband signal is distributed to each of the subscriber premises 30 by tapping a portion of the signal from the nearest feeder 22 with a tap 26, which is then connected to the subscriber premises through a standard coaxial cable drop 28. The CATV network thus provides a broadband communications path from the headend 14 to each of the subscriber premises 30, which can number in the several hundreds of thousands.

While one preferred embodiment of the invention shows the input interface 32 coupled to the fiber node 16 and the output interface 34 coupled to the headend 14, it is evident that the insertion and extraction of the RF telephony signals need not be limited to this single architecture. Both the input interface 32 and an output interface 38 (shown in phantom) can be connected at the fiber node 16. Alternatively, both an input interface 36 (shown in phantom) and the output interface 34 can be coupled to the headend 14. Moreover, the input interface 36 can be coupled to the headend 14, while the output interface 38 can be coupled to the fiber node 16. For cable architectures which do not conform to a star configuration, it is generally most advantageous to insert the RF telephony signals at the headend and to extract them from the system at the headend.

The input and output interfaces 32 and 34 produce a facile method for inserting the telephony signals in one direction and extracting the telephony signals in the other. The telephony signals are transformed into compatible RF signals which can be inserted or extracted from the CATV network 12 in much the same manner as other programming at various points in the network. The compatibility of RF telephony signals with the previous RF signals on the CATV network 12 allows their transmission in a transparent manner over the network without interference to the other signals or special provision for their carriage.

Theoretically, the broadband communications path provided by the CATV network 12 is bidirectional so that information can be passed in each direction. However, because of convention and the single point to multipoint nature of most networks, the reverse path, i.e., communications originating from the subscriber premises 30 and communicated to the headend 14, is much more limited. Normally, the reverse amplifiers 25 are bandwidth limited and include diplexers which separate the CATV spectrum into forward and reverse paths based on frequency.

In summary, the described system provides for broadband communications including digital communications, telephony, and telephony-related services by utilizing a CATV system in an efficient manner, while not requiring extensive switching equipment and a redesign of such systems. The broadband communications system requires no switching in the normal context when connecting telephony based calls from a subscriber or to a subscriber. A multiplicity of calls can be placed through the system efficiently using the broad bandwidth of the CATV network to utilize its best features and having the switching for the connection of the calls performed by the telephony network to utilize its best features.

There are two types of telephony calls in the broadband communications system, where one is an incoming call and the other is a outgoing call. With combinations of these types of calls, all the necessary connections to or from another telephony set and to or from a CATV network subscriber can be made. The subscriber may call (or be called by) another subscriber within the CATV network system, may call (or be called by) a local telephone set within the local area of the telephone network, or may call (or be called by) the telephone network to interface to the long distance and international telephony systems.

An incoming call is directed to a particular subscriber of the CATV network by the telephony network recognizing that the call is directed to one of the group of subscribers belonging to the CATV network. The call is then switched by the telephony network to the OC-1 or other standard telephony signal coupled to the CATV network in the time slot assigned to that subscriber. The addressing and control system of the CATV network then decodes the multiplexed information and translates it into a frequency and time position in the forward multiplex that has been assigned to the particular subscriber. The addressing and control system further provides the necessary control for causing the subscriber equipment to ring or alert the subscriber of an incoming call.

The telephony network and CATV network maintain the connection until there is an indication of an "on hook" signal by one of the parties or another signal that indicates that the communication is complete, such as an end of message data pattern or the like. What is meant by maintaining the connection is that the telephony network continues to place the called party's data packets into the assigned DS0 position in the standard telephony signal and the broadband communications system continues to convert them to the location and frequency in the forward multiplex that is directed to the particular subscriber.

For outgoing calls, the telephony network recognizes from the DS0 position in the standard telephony signal which data packet belongs to a particular originating subscriber of the CATV network. This is an assigned position and the CATV system converts data on whatever carrier frequency is input to the demodulators to that assigned position in the reverse multiplex. Therefore, for outgoing calls the telephony network will consider the standard telephony signal as a group of individual DS0 signals, whose location in the reverse multiplex identifies the originating subscriber.

Figure 2:
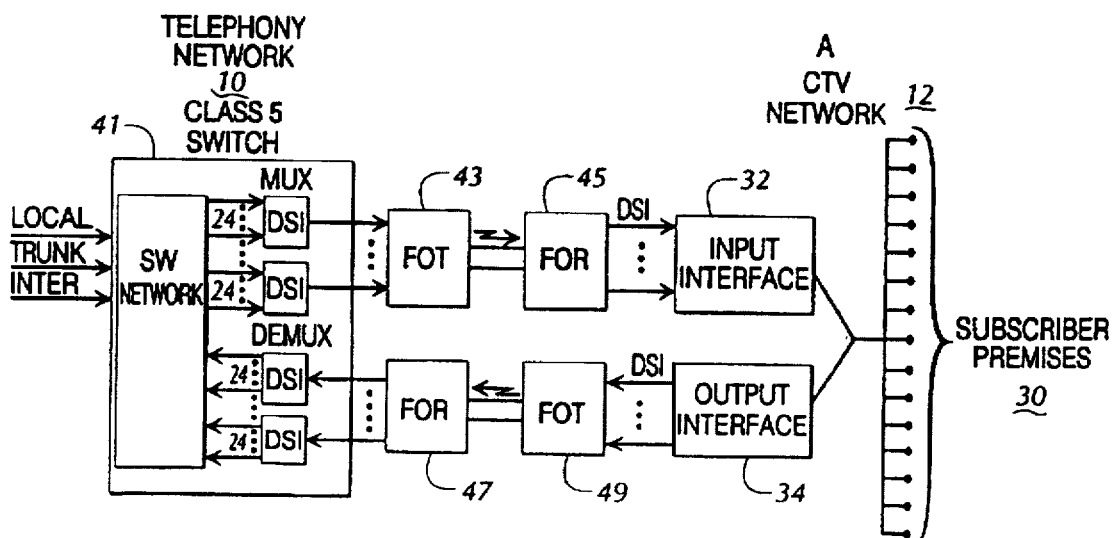
FIG. 2 is a system block diagram of one embodiment of the broadband communications system illustrated in FIG. 1 connected to a telephony network.

FIG. 2 illustrates a preferred implementation of the broadband communication system configured as an extension to a telephony network. For connection to the telephony network 10, a class 5 switch 41 is used. The switch 41 has suitable circuitry for handling conventional local, trunk and interconnect signals which integrate the switch into the local area, national and international calling grids. The switch 41 has a switching network of crosspoints which may switch any of a plurality of inputs to any plurality of outputs. Particularly, the switch 41 has equipment to provide DS1 format interfaces.

As known to those skilled in the art, a "DS0" signal is a standard telephony format corresponding to a 64 kb/s digital channel which can be used for voice, data, audio, etc. Thus a single DS0 telephony signal can be viewed as a single telephone conversation. Likewise, a "DS1" signal corresponds to a 1.544 Mb/s digital channel that contains 24 DS0 channels. For a summary of the bit rates of the standard digital telephony formats and their relationships to one another, see TABLE 1 below:

TABLE 1

| Digital Signal | Bit Rate | DS0 | DS1 | DS3 |
|---|---|---|---|---|
| DS0 | 64 kb/s | 1 | 1/24 | 1/672 |
| DS1 (also T-1) | 1.544 Mb/s | 24 | 1 | 1/28 |
| DS1C | 3.152 Mb/s | 48 | 2 | 1/14 |
| DS2 | 6.312 Mb/s | 96 | 4 | 1/7 |
| DS3 | 44.736 Mb/s | 672 | 28 | 1 |
| OC-1 | 51.84 Mb/s | 672 | 28 | 1 |

Additionally, the switch 41 has means for demultiplexing DS1 signals into a plurality of DS0 signals which then can be routed to outgoing points. The system uses a forward path which receives a plurality of the DS1 channels at the input interface 32 and connects them over the CATV network 12 to the subscriber premises 30. The subscriber premises 30 transmits telephony signals over the CATV network 12 to the output interface 34 which converts them back into the same number of DS1 signal channels for transmission to the switch 41. If the switch 41 is located proximately to the input interface 32 and the output interface 34, then they can be coupled directly. Alternatively, as will be the most prevalent case, where a headend or fiber node is not located proximately to the class 5 switch, an optical fiber link can be used to connect the switch 41 and interfaces 32 and 34.

In the forward direction, a fiber optic transmitter (FOT) 43 converts the plurality of DS1 telephony signals into an optical signal which is transmitted to a fiber optic receiver (FOR) 45. The fiber optic receiver 45 converts the optical signal back into the DS1 format telephony signals. Likewise, the fiber optic transmitter 49 in the reverse path converts the outgoing DS1 telephony signals into an optical signal which is received by the fiber optic receiver 47 for conversion back into the DS1 telephony format signals.

The DS1 telephony signal format was chosen because it is a standard telephony format, and conventional optical links to do the conversion and transmission are readily available for the transmitters 43, 49 and for the optical receivers 45, 47.

The system uses this bidirectional mode of communication where each DS1 signal contains 24 DS0 channels, which can be considered groups of 64 kb/s digital data channels. The 64 kb/s channels can either be used for voice, data, audio (music, stored information), etc. In general, for telephony type signals, each DS0 channel derived from a connected DS1 link is addressed to and associated with a particular subscriber. The preferred embodiment provides transport from each DS0 signal in the connected DS1 link to the particular subscriber, by transmitting incoming telephony signals downstream in a selected DS0 downstream channel in the broadband system forward path, and has a corresponding DS0 upstream channel assigned to that subscriber in the broadband system reverse path for outgoing telephony signals. Received DS0 signals from subscribers are then routed to the corresponding DS0 time slot in the DS1 link for outgoing signals. This permits the switch 41 to connect any of the local, trunk or interconnect calling points to any of the DS0 channels in the forward path and its associated DS0 channel in the reverse path to the same local, trunk or interconnect points for completing the communications path. Each of the subscribers 30 appears as another DS0 subscriber connected directly to the class 5 switch 41. The distribution system of the CATV network 12 is transparent to the switch 41 and does not need any further communication, information or connection to the broadband communication system.

Figure 3A:
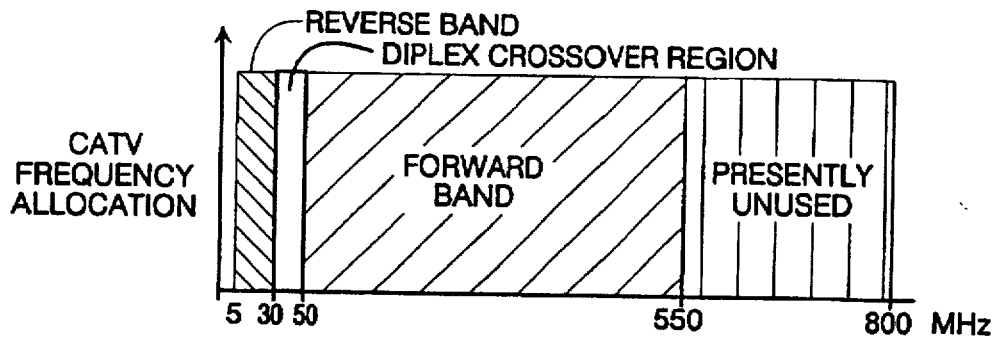
FIG. 3A is a pictorial representation of the frequency allocation of typical split CATV systems illustrating their forward and reverse signaling bands.

FIG. 3A illustrates a typical frequency allocation for many of the installed split band CATV networks. The frequencies used for programming which generate the revenues for the system operator are carried in the forward band from 50 MHz to about 550 MHz. Although, the frequencies above 550 MHz are not presently used, there has been increased interest in providing additional services in this unused forward bandwidth, currently considered to extend to about 1 GHz. Conventionally, the forward band comprises a series of video channels, each 6 MHz in bandwidth, which are frequency division multiplexed across the forward band. Several areas are not used and each video channel has a 1.5 MHz guard band between other adjacent channels.

In combination with the forward band, the typical CATV spectrum includes a reverse band from about 5-30 MHz. These frequencies have been allocated for signals returning from the subscriber to the headend. This band has traditionally been relatively narrow because of the high noise from the funneling effects of the multiplicity of the multipoint signals adding to a single point. Further, in the past bandwidth taken from the forward band has meant less revenues from other services. The present invention provides a solution to these problems by providing a system where the telephony signals to a subscriber premises are communicated in the forward band of the spectrum and the telephony signals from a subscriber premises are communicated in the reverse band of the CATV system.

Figure 3B:
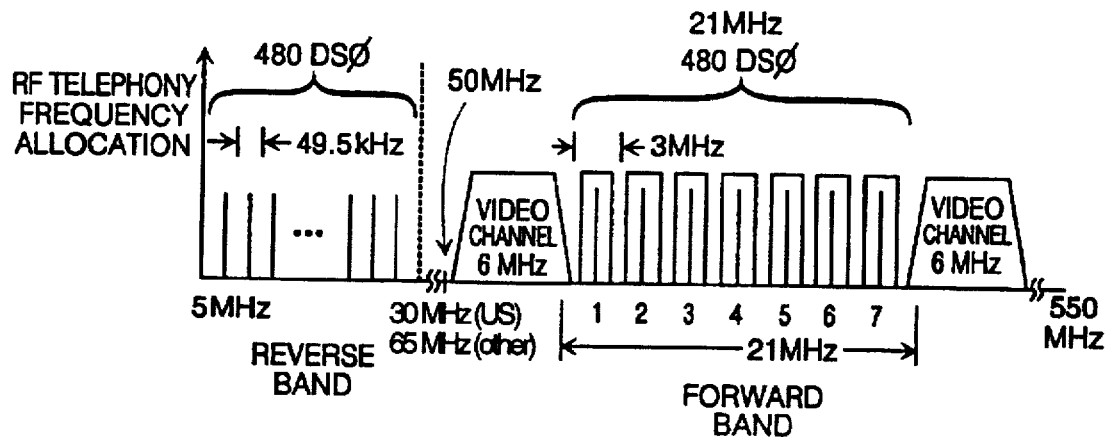
FIG. 3B is a pictorial representation of the frequency allocation of the broadband communications system illustrated in FIG. 2.

As seen in FIG. 3B, the broadband communications system utilizes a plurality of frequency division multiplexed carriers in the forward band to communicate the telephony signals to the subscribers. In the illustrated embodiment, seven (7) channels of approximately 3 MHz are used to carry incoming telephony signals from the telephony network 10. Each forward channel is a QPR modulated carrier, where the modulation occurs as a 6.312 Mb/s digital data stream in three DS1 telephony signals including 72 DS0 telephony signals. The carriage capacity of such a system is then at least 20 DS1 channels, or enough for at least 480 DS0 voice channels.

Each of the reverse band signals are about 50 kHz in bandwidth (49.5 kHz in the presently preferred embodiment), which is narrow enough to be easily placed at different frequency division multiplexed positions in the frequency spectrum. The modulators are frequency agile and can reallocate frequencies based upon traffic over the system, noise, channel condition, and time of use. The 49.5 kHz wide carriers can be placed anywhere in the reverse band that there is space for them. Depending upon the CATV system, i.e., whether there is a reverse amplification path in the distribution network, they could also be allocated to frequencies normally reserved for forward band transmissions. Further, such system is expandable by bandwidth for other uses besides the individual telephony signals. For example, if a particular subscriber required a return path of a greater bandwidth than 49.5 kHz, then the bandwidth could be easily allocated to this use without a complete reconfiguration of the system. Such uses may include high speed data transmissions, trunk connections for small central offices, video services originating from the telephony network, and other uses requiring a nonstandard bandwidth.

There are a number of advantages with the broadband communications system as described. It uses the reverse band efficiently and uses only that portion of the forward band which is necessary. Digital QPR and QPSK modulation is used to permit digital and telephony services to the subscriber and provide a robust signaling method allowing the forward or reverse signals to be placed anywhere in the CATV band, either at high or low frequencies without signal to noise ratio concerns. Moreover, in the forward direction, the carrier signals are minimized so that carrier overloading does not occur and that the 3 MHz channels can be placed where space is found.

Figure 3C:
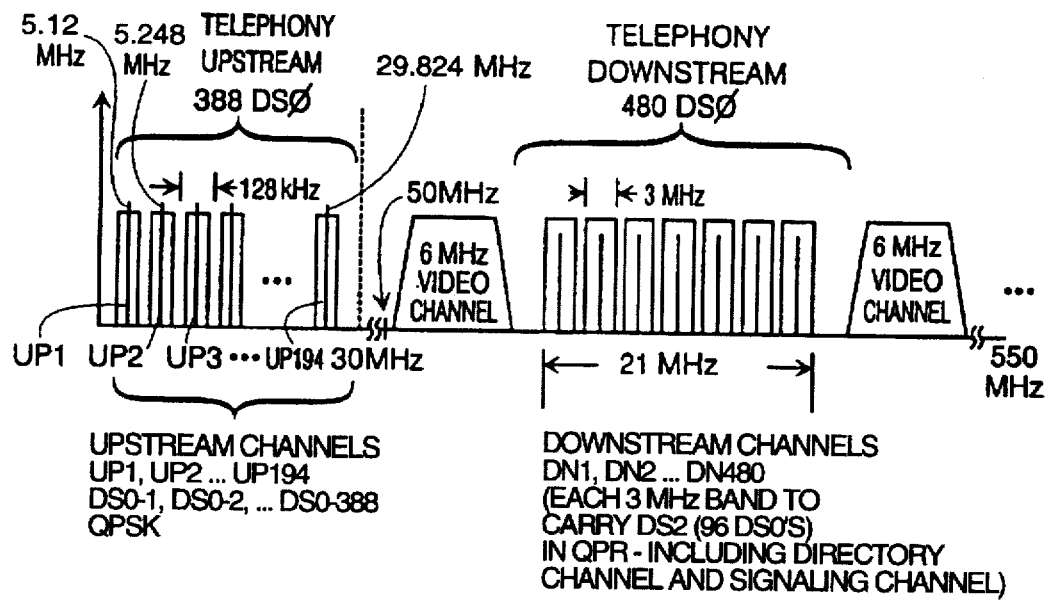
FIG. 3C is a pictorial representation of the frequency allocation of an alternative embodiment of the broadband communications system.

FIG. 3C illustrates an alternative frequency allocation for a split band CATV network. As in the other systems, the frequencies used for television programming that generate the revenues for the system operator are generated in the forward band from about 50 MHz and above. The spectrum in FIG. 3C includes the reverse band from about 5 MHz to about 30 MHz. The 5–30 MHz band is used for upstream telephony signals in the form of 388 DS0's, combined to form DS0 pairs and QPSK modulated in 128 kHz upstream channels or subbands designated UP1, UP2, . . . UP194, where each upstream channel UPn carries 2 DS0's. Thus, in order to accommodate 388 DS0's, 194 QPSK carriers or channels are required. Each of the upstream channels UPn consumes 128 kHz bandwidth, comprising 108 kHz of modulated signal space and 20 kHz of guard band.

The downstream telephony is provided in downstream channels DN1, DN2, . . . DN480, each DN corresponding to a DS0. In one preferred alternative embodiment, a total of 21 MHz of bandwidth is provided in 3.168 MHz subbands, each 3.168 MHz subband carrying the equivalent of three DS1 telephony signals (72 DS0's), in QPR modulation.

Figure 3D:
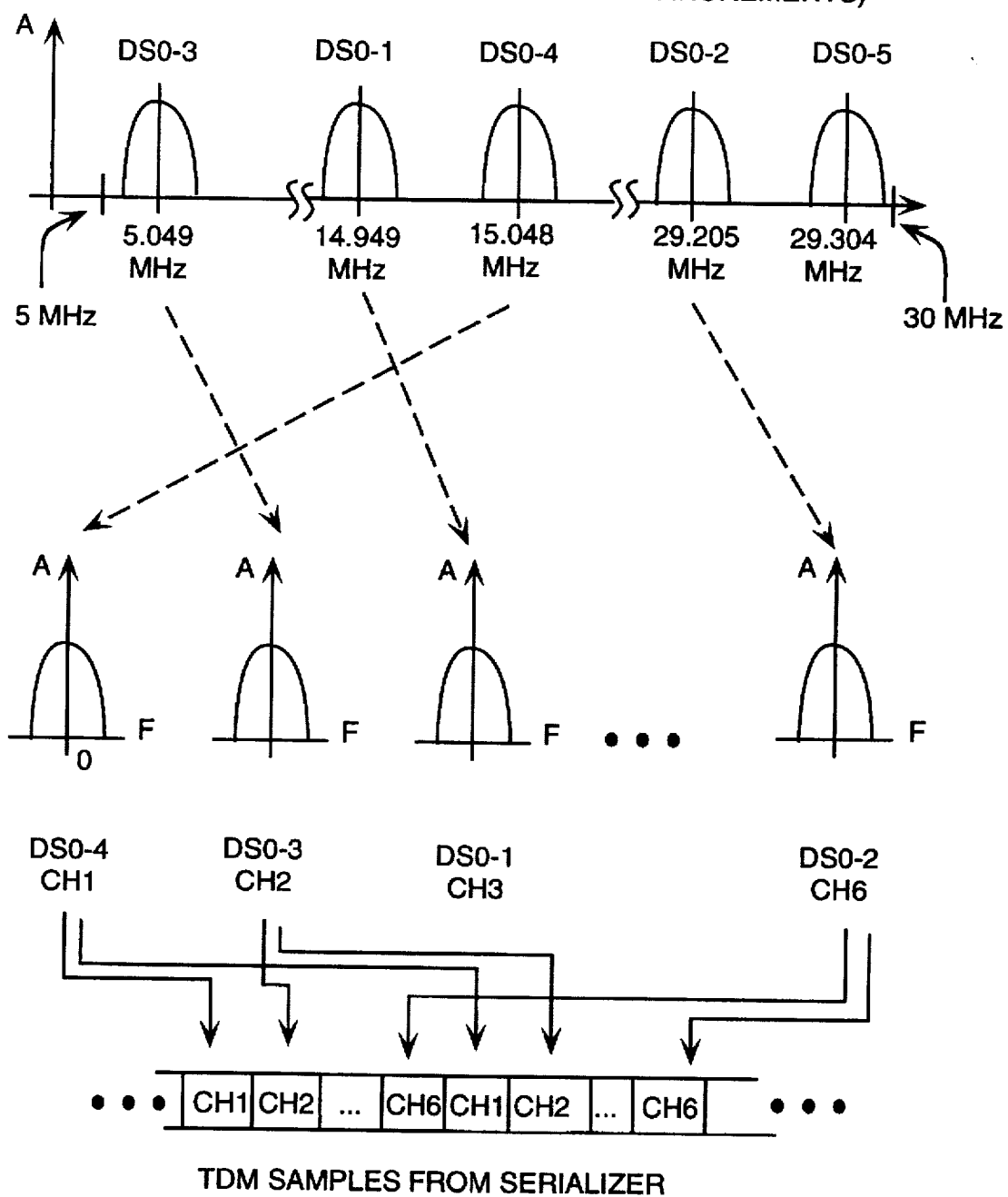
FIG. 3D is a pictorial frequency domain representation of the conversion of QPSK modulated DS0 telephony channels to baseband DS0 channels for processing by the present invention.

FIG. 3D, which will be discussed in greater detail below, illustrates the frequency downconversion of the reverse band QPSK modulated DS0 telephony signals into baseband before processing with the system of the present invention. As will be discussed later, the QPSK modulated DS0 telephony signals in the reverse band, e.g. DS0-1 at 14.949 MHz, DS0-2 at 20.205 MHz, etc. are converted to baseband signals, e.g. DS0-1 at CH3, DS0-2 at CH6, etc., before processing.

Figure 4:
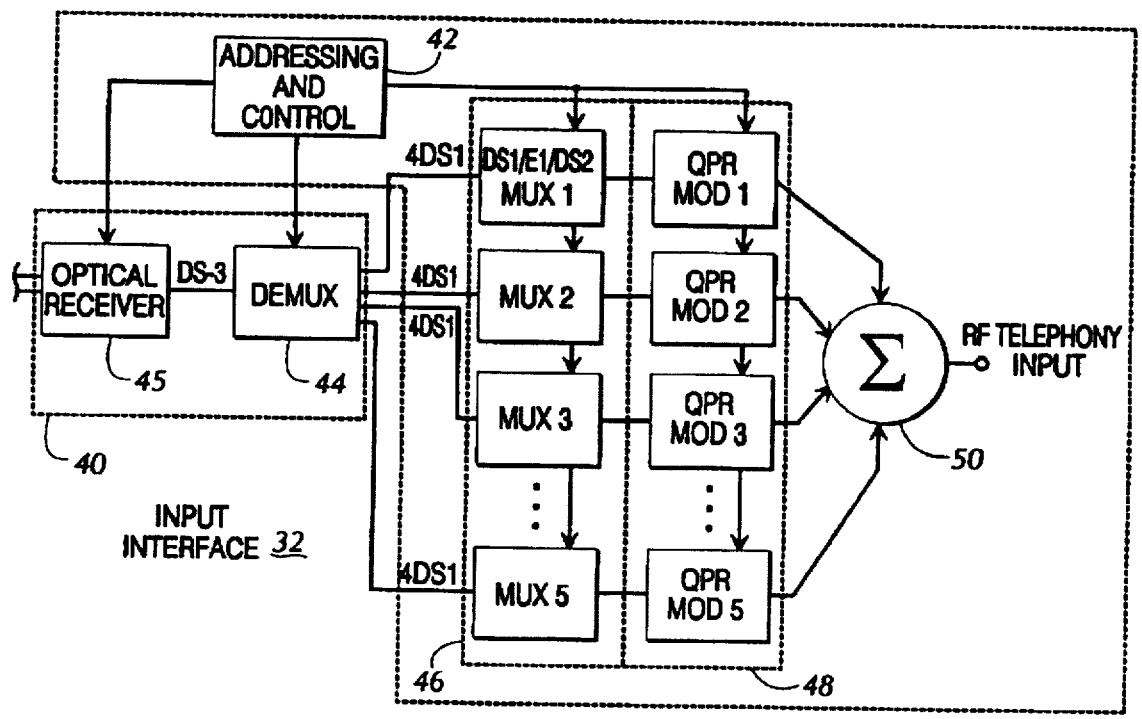
FIG. 4 is a detailed block diagram of the telephony network to the CATV network input interface of the system illustrated in FIG. 2.

A detailed block diagram of the input interface 32 is illustrated in FIG. 4. The function of the input interface 32 is to convert the 20 DS1 telephony signals into the seven QPR modulated RF signals which are sent to the subscribers in the forward band of the CATV system 12. The input interface 32 is connected to an optical interface 40, comprising a fiber optic receiver 45 and a demultiplexer 44. The fiber optic receiver 45 operates to convert the optical signal into an RF digital signal of a standard telephony format. The demultiplexer 44 receives the digital DS3 telephony signal and separates it into its 28 component DS1 signals, where each DS1 signal comprises 24 DS0 signals. The optical interface 40 also allows an addressing and control unit 42 to decode and strip overhead and framing bits from the signal.

The input interface 32 comprises a series of five multiplexers 46, which each take four of the DS1 signals from the demultiplexer 44 and combine them with signaling and addressing bits from the addressing and control unit 42 to form a 6.312 Mb/sec serial digital signal. Each of the five digital signals is modulated on a selected carrier frequency by an associated QPR modulator 48. The five telephony channels from the outputs of the modulators 48 are frequency division multiplexed together in an RF combiner 50 before being inserted conventionally on the CATV network 12.

The output interface 34 will now be more fully described with reference to FIG. 5. The output interface 34 functions to convert the 480 DS0 digital signals which are QPSK modulated on the reverse band carriers into the optical format for coupling to the telephony network 10. The output interface 34 extracts the reverse band signals in a conventional manner and fans them out with a signal divider 60 to a plurality of tuner/demodulators 62. Each of the tuner/demodulators 62 is adapted to tune one of the carrier frequencies of the reverse band signals and demodulate it into a DS0 format digital signal. The tuners of the tuner/demodulators 62 can be variable or fixed, or can be adapted to tune only certain bands of the reverse spectrum. The output of the tuner/demodulators 62 is 480 DS0 signals which are concentrated into groups of DS1 signals by a group of multiplexers 64 under the control of addressing and control unit 66.

In accordance with the preferred embodiment of the present invention, the tuner/demodulators 62 are constructed to provide up to 24 DS0 signals from four DSPs, utilizing the baseband processing systems and methods as described herein. The construction of such an arrangement is described in greater detail below.

Each of the multiplexers 64 inputs 24 DS0 formatted signals and outputs one DS1 formatted signal to a fiber optic transmitter 49. At the fiber optic transmitter 49, the 20 DS1 signals are concentrated by a multiplexer 68 into a single DS3 digital signal which is input to the optical transmitter 70. The addressing and control unit 66 adds the necessary control information in the optical transmitter 70 before communicating the digital DS1 signals in an optical format. The optical transmitter 70 also converts the RF signal into light so the optical fiber of the telephony network can transmit it.

Figure 6:
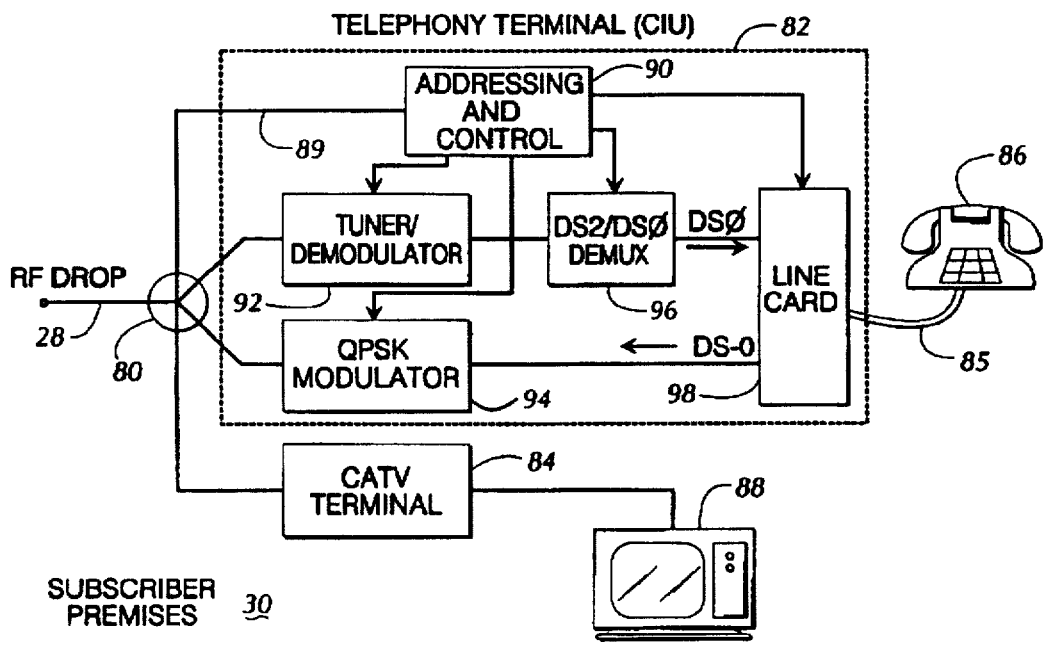
FIG. 6 is a detailed block diagram of a telephony terminal for receiving telephony signals from the telephony network through the CATV network and for transmitting telephony signals to the telephony network through the CATV network.

A detailed block diagram of the system equipment at the subscriber premises 30 is shown in FIG. 6. Generally, the subscriber will want to maintain CATV video or other services and has a CATV terminal 84 for this purpose connected between the CATV drop line 28 and a television receiver 88. The CATV terminal is connected to a splitter/combiner/diplexer 80 coupled to the drop 28 from one of the CATV coaxial subnetwork feeders.

Because the presently described broadband communications system does not interfere with or displace the conventional CATV programming and frequency allocations, the CATV terminal 84 can generally be used with no modification or change in operation of the installed terminal base. The system operator does not need to change or reconfigure its distribution network operation and the new telephone service is compatible with its installed CATV subscriber terminal base.

The broadband communications service is provided by coupling a telephony terminal, also called a "customer interface unit" 82, between the splitter/combiner/diplexer 80 and the telephone equipment 86. The customer interface unit 82 converts the incoming telephony signals to a subscriber into analog signals which can be used by a standard telephone handset 86 over a pair of twisted wires 85. Further, the customer interface unit 82 converts the analog signals, representing outgoing telephony signals from the handset 86, into a QPSK modulation which is coupled to the CATV network. A standard telephone handset 86 is shown for the purpose of illustration but could in fact be any equipment normally connected to a telephone line for digital communications purposes.

The telephony terminal 82 has two communication paths. The first path for incoming signals comprises a tuner/demodulator 92, demultiplexer 96, and a portion of a line card 98, and a second path for outgoing signals comprises a portion of the line card 98 and a modulator 94. The tuner/demodulator 92, modulator 94, demultiplexer 96, and line card 98 are under the control of an addressing and control unit (CPU) 90.

For incoming telephony signals which are received in the 3 MHz channels modulated on an FDM carrier, the control unit 90 causes the tuner/demodulator 92 to tune the carrier on which the particular call information directed to the subscriber is carried. The carder defines one of the seven 3 MHz channels having 3 DS1 or 3 E-1 telephony signals QPR modulated thereon.

The telephony signals are demodulated by the tuner/demodulator 92 into a serial digital stream containing the 3 DS1 or 3 E-1 telephony signals before being input to the demultiplexer 96. The demultiplexer 96 selects the particular DS0 digital telephony channel assigned to the subscriber at the input rate of 64 kb/s and inputs the data to an input terminal of the line card 98. The control unit 90 determines which forward telephony channel to tune and which DS0 signal to select from that channel from the signal and addressing information it receives by its connection to the splitter/combiner/diplexer 80 via line 89.

The DS0 digital format provides a voice channel with sufficient bandwidth for voice quality communications. The DS0 format is a 64 kb/s data stream of bytes forming timed samples of an analog voice signal. This produces a voice signal quantized to 8-bits per sample (256 values) at a sampling rate of 8 kHz and with a bandwidth of 4 kHz.

The line card 98 receives the digital telephony signal in the DS0 format and converts it to the proper analog voltages and signals to drive the telephone handset 86. In addition, the line card 98 provides ringing current, terminal identification, and other standard functions under the direction of control unit 90. The line card 98 receives the analog telephony signals from the telephone handset 86 and converts them into a digital DS0 format. Dialing signals and other addressing and control signals from the handset 86 are also digitized by the line card 98. The digitized outgoing telephone signals are then combined and formatted by the line card 98 into a DS0 format at 64 kb/s and input to the modulator 94.

The modulator 94 under the regulation of the control unit 90 selects a carrier frequency in the reverse band and QPSK modulates the DS0 telephone signal thereon. The QPSK modulated carrier having a bandwidth of 49.5 kHz is coupled on the CATV network through the splitter/combiner/diplexer 80. The QPSK modulated outgoing telephony signal is then received at an output interface 34 (either on a stand-alone basis or associated with a headend unit 14) and demodulated into DS0 format for coupling to the telephony network.

Before leaving FIG. 6, it will be understood that the nature of the telephony service that is provided at any given CIU 82 must be preidentified and prestored in memory in the HIU 14 or circuitry that is utilized as the telephony network interface, so as to enable provision of the selected service upon demand. In response to a request for service either originating with a subscriber at a selected CIU, or a request for incoming service to a subscriber originating externally to the network, status signals such as the subscriber going off hook, or a ringing condition on an incoming line, the system causes the selection and allocation of appropriate bandwidth, DS0 channels, reverse channels, carriers, etc., required to provide the selectably variable bandwidth commensurate with the selected service.

Incoming data from the broadband network is derived from the forward channel demodulator 92, which is operative to monitor a preassigned channel in the QPR-modulated forward channel utilized for incoming telephony signals. The preferred forward demodulator 92 demodulates a QPR modulated forward channel signal in the designated telephony downstream subband of 15.840 MHz, and monitors the directory channel and signaling channels provided as a part of the overhead data.

It will be understood that a plurality of reverse channel modulators 94 may be required to provide the appropriate bandwidth required for a given level of service. For example, if a selected service at a given CIU 82 entails the equivalent of four DS0's, then there is the need for four reverse channel modulators 94. Furthermore, it will be recalled that each modulator 94 is frequency agile and is not necessarily operating at a given fixed upstream carrier frequency, since upstream channels can be reassigned dynamically and in response to changing conditions such as noise level and reallocation of bandwidth in response to the subscriber's needs.

It will also be understood that the CIU 82 can be physically configured either as separate customer premises equipment located in or near a subscriber's telephony punch blocks, or as a CATV set top terminal including one or more RJ-11 or similar telephone connectors. Moreover, the CIU, since it includes a computer (as a part of the addressing and control unit 90) and associated circuitry can be used for conventional CATV signal management such as pay-per-view control, descrambling, etc. Therefore, the preferred CIU, whether settop or separate circuitry enclosure, preferably includes a control connection provided from the addressing and control unit 90 to a switch (not shown in FIG. 6) associated with the signal line between the splitter 80 and the subscriber's television 88. This allows the programming signals to be disconnected from a subscriber in the event of non-payment or election not to receive a certain programming.

Finally, each CIU 82 is associated with a unique predetermined serial number for identification purposes in the network. This serial number is preferably maintained internally in a read-only memory. Also, within a particular network configuration, each CIU is assigned a unique 16-bit address by the HIU. The address of the CIU is provided in the upstream channel to the HIU whenever the CIU requests service. The address information is utilized by the HIU to examine a service level table or data array, described below, to identify the subscriber associated with the address information and determine the appropriate and authorized level of service to be provided. For example, when a telephone connected to the CIU goes off hook, the address of the CIU is transmitted in association with the off hook status information in the upstream channel to the HIU (or network interface), where it is received and examined to determine the appropriate service level, DS0 assignments, frequency assignment, etc.

The service level table or data array stored by the comprises an array of data fields, suitable for storage in a database maintained by the HIU's CPU 308. Preferably, this table is maintained in RAM for rapid access. Furthermore, it is preferred that the table be indexed utilizing conventional database indexing methods so that the table may be rapidly search by subscriber name, subscriber address, telco DS0 number, upstream carrier frequency, etc. Use of indexed methodologies ensures rapid lookup of service level and minimized response time when a subscriber requests service.

From the foregoing, it will be understood and appreciated that the frequency agile CIU is operative for modulating telephony and other signals from a subscriber in a plurality of frequency subbands in the upstream band of a broadband subscription network so as to provide selectably variable bandwidth in the upstream band commensurate with a selected subscriber communication feature such as single voice line, multiple voice lines, ISDN, security monitoring services, and the like. In the preferred embodiment, the bandwidth is selectably allocated in discrete unit of DS0's, which will be understood can be combined to provide for higher capacity digital data channels in response to varying needs of subscribers.

Furthermore, it will be understood that the frequency agile CIU is operative to reassign signals in a selected subband, such as UP1 . . . UPn, to another subband at another frequency in response to a determination that the noise level in a particular selected subband exceeds a predetermined level.

Finally, there is provided one upstream data link for each carrier that is utilized by the CIU 82 to provide a general purpose data transport for alarm conditions, configuration information, etc. Each CIU 82 is normally assigned at least one upstream frequency (either the DS0-1 or the DS0-2 of the 128 kHz channel), which comprises a portion of the 1.333 kbps data channel that is combined with two 64 kbps data channels to form 72 kbps for each upstream frequency subband. The 1.333 kbps data link carries the subscriber's address as well as status information associated with a subscriber's address.

Figure 7:
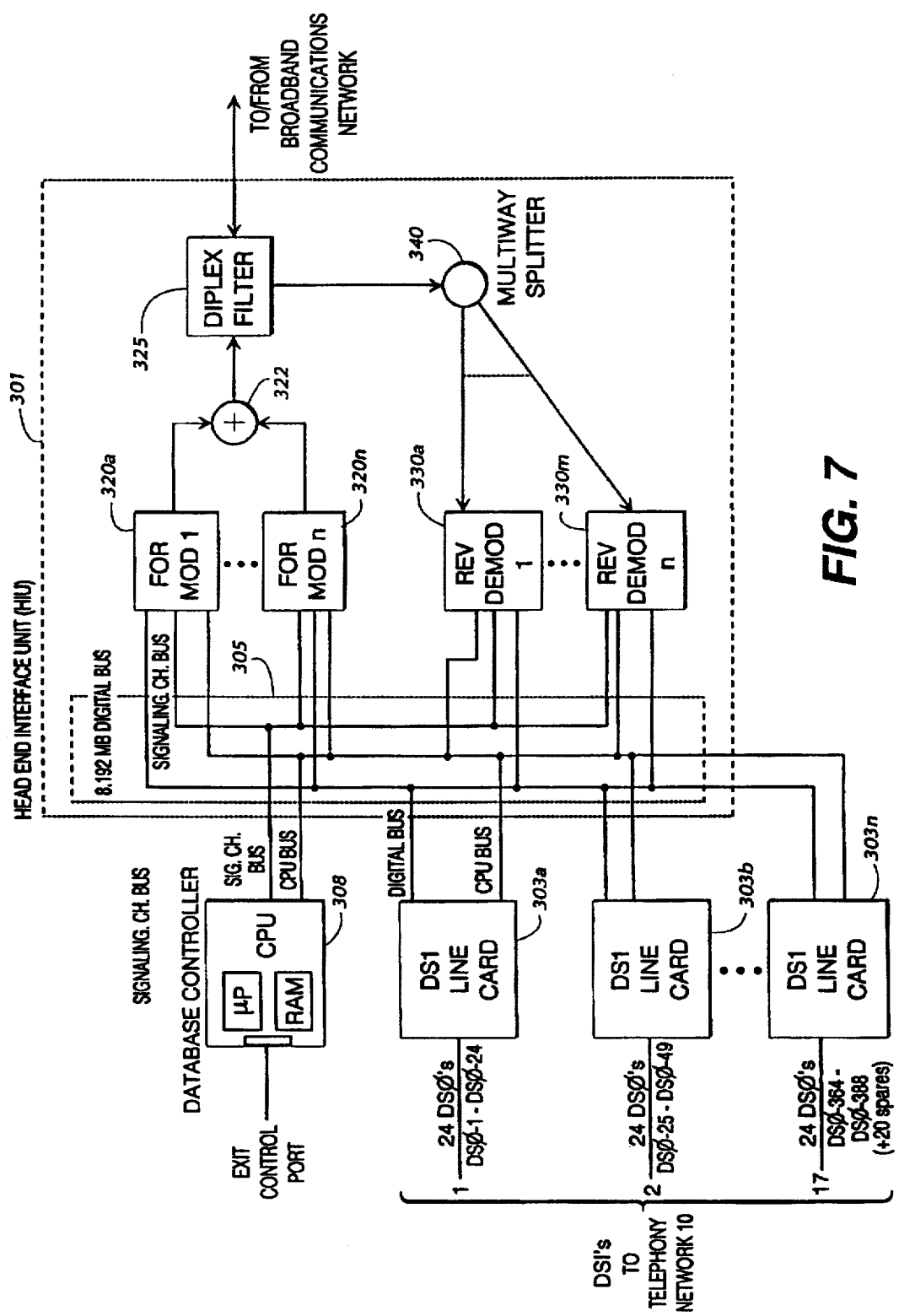
FIG. 7 is a block diagram of a headend interface unit (HIU) constructed in accordance with the preferred embodiment of the present invention.

Turning next to FIG. 7, the preferred embodiment of a headend interface unit (HIU) 301 constructed in accordance with the present invention will be described. A HIU constructed as shown in FIG. 7 may be utilized to carry out the invention as an alternative to providing a separate input interface 32 and output interface 34 as shown in FIG. 1. Stated in other words, a HIU 301 constructed as in FIG. 7 may be utilized to implement the combination of a headend 14, input interface 36, and output interface 34 shown in FIG. 1.

The HIU 301 is suitable for use either as equipment comprising the headend 14 or equipment comprising the fiber node 16 shown in FIG. 1, both of which are operative for receiving multiplexed digital telephony signals in a standard telephony format such as DS3, DS2, DS1, and coupling such signals to an input interface 32, 36 or an output interface 34, 38. Although the preferred embodiment is described in connection with a coaxial line HIU, it will be understood that the principles are applicable for an optical-fiber based HIU that employs methods for communicating broadband signals via amplitude modulation (AM) methods, such as described in U.S. Pat. No. 5,262,883, which is owned by the assignee of the present invention. Briefly described, the HIU 301 is operative for connecting to a telephone company (telco) standard multiplexed telephony signal, directing incoming telephony signals to subscribers downstream on the broadband network using QPR modulation in the forward path, and receiving outgoing telephony signals from subscribers upstream on the broadband network in one or more selected subbands within the reverse path spectrum, commensurate with service levels or features elected by subscribers.

Figure 5:
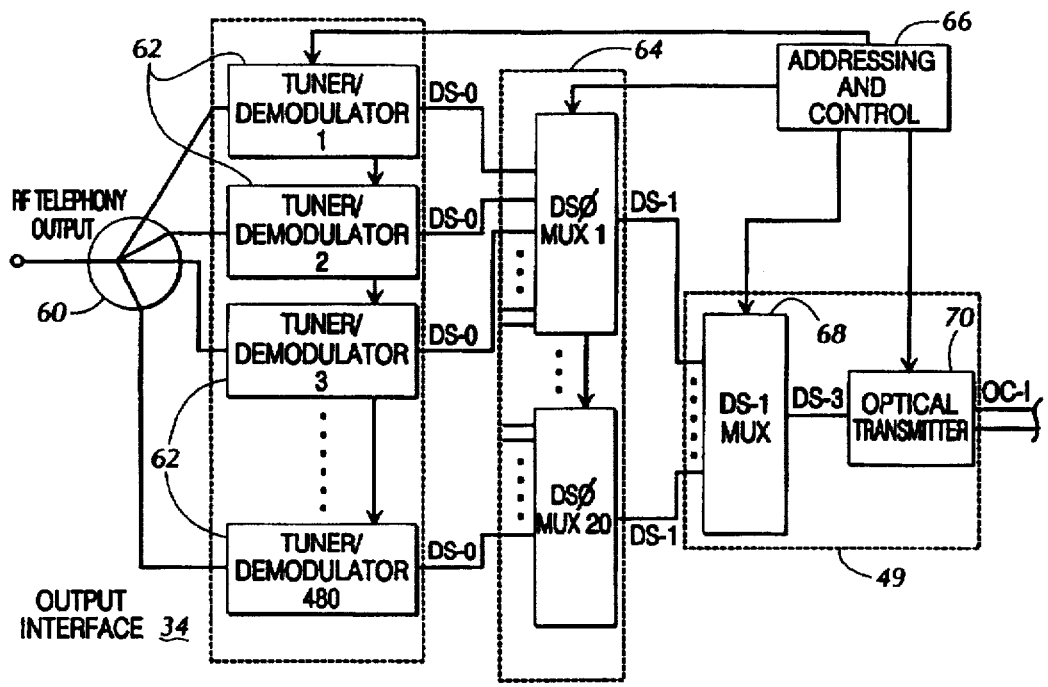
FIG. 5 is a detailed block diagram of the telephony network to the CATV network output interface of the system illustrated in FIG. 2.

The alternative HIU 301 shown in FIG. 7 is a presently preferred embodiment involving the use of digital line cards 303a, 303b, . . . 303n that provide digital signals to a digital bus or backplane 305, operating together with a central processing unit (CPU) 308 corresponding to the address and control unit 42 as shown in FIGS. 4 and 5.

The HIU 301 comprises a plurality of DS1 line cards 303a, 303b, . . . 303n, where n is 17 in the disclosed embodiment, for connection to the telephony network 10 or to a higher level multiplexer/demultiplexer capable of handling higher level multiplexing such as DS2 or DS3. It will be recalled that each DS1 corresponds to a T1 line, each T1 line comprises 24 DS0 standard telephony channels. For provision of 388 DS0's, therefore, slightly more than 16 DS1's must be accommodated. With 17 DS1 line cards 303, a number of lines are provided as spares.

Each DS1 line card 303 provides interfaces compatible with ANSI Doc. T1.403 (1989 version), which is incorporated herein by reference and made a part hereof. Each line card 303 provides a digital output signal that is coupled to the digital backplane 305. The backplane operates to connect all of the line cards 303 and route signals between the line cards and the forward and reverse path modulators, to be described. The backplane 305 preferably comprises up to five 8-bit serial digital busses each clocked at 8.192 MHz. Each bus thus provides an 8.192 Megabit per second (Mb/s) digital pathway that is operative to receive digital signals from each of the line cards in a time division multiple access (TDMA) format. It will be appreciated that five 8.192 Mb/s digital busses in parallel are sufficient to handle the 388 separate 64 kbps signals.

The backplane 305 further includes a CPU bus coupled between a CPU 308 utilized as a database controller and each of the line cards 303 The CPU 308 is operative to control the assigned relationships between particular telephony lines, ingoing and outgoing, with predetermined carrier assignments in the reverse path and in the forward path, monitor the noise level in the reverse path, and assign DS0 channels in the reverse path commensurate with subscriber features and the like. Further, the CPU 308 is operative to carry out steps of monitoring noise in the reverse pathway channels, dynamically allocating bandwidth, and to maintaining in memory a service level table that indicates the correspondence between reverse channel carrier frequencies, subscriber identification, service level, telco DS0 identification, signaling status, error count for noise monitoring, and the like.

The preferred CPU 308 is a Motorola 68360 32-bit microprocessor with built-in memory (DRAM) controller and is operatively connected to 2 MB of random access memory (RAM). Details of the preferred CPU are available in the literature supplied by the manufacturer.

Still referring to FIG. 7, the backplane 305 further includes a signaling channel bus connected between the CPU 308 and each of a plurality of forward channel modulators 320 and reverse channel demodulators 330. The signaling channel bus communicates status information associated with a telephony line such as off hook, on hook, busy, ring, security status, and the like. Bits associated with particular status states of the subscriber's telephone and of the associated telco line are included and combined with digitized telephony signals and transmitted to the CIU's 82.

In the disclosed embodiment, the HIU 301 comprises a plurality of forward channel modulators 320a . . . 320n and a plurality of reverse channel demodulators 330a . . . 330m The forward modulators 320 couple outgoing telephony signals to the broadband network in the forward spectrum, while the reverse channel demodulators receive telephony signals from CIU's in the reverse spectrum via the broadband network. Each of the forward channel modulators 320 is connected to a combiner 322 that is operative to combine the RF signals from the forward channel modulator and provide an output to a diplex filter 325. The diplex filter 325 is preferably a bandpass filter that passes signals outward within the 15.840 MHz frequency forward spectrum provided in the alternative embodiment whose spectral allocation is shown in FIG. 3C. The output of the bandpass filter, whose frequency is centered at an appropriate location along the spectrum allocated for forward or downstream telephony signals, is then coupled to a multiway splitter 340 that is coupled to the broadband communication network.

It will be appreciated that the broadband communication network (not shown) connected to the multi-way splitter can either be a coaxial cable network, or alternatively can be an additional fiber optic link that is amplitude modulated to carry the broadband signal in a manner known to those skilled in the art.

Still referring to FIG. 7, the HIU 301 further comprises a plurality of reverse channel demodulators 330a . . . 330m that are connected to receive signals from the multiway splitter 340. The reverse channel demodulators 330 are similarly constructed, as described in connection with FIG. 8. A separate reverse channel demodulator constructed as described herein is provided for each group of 24 DS0 telephony signals.

The multiway splitter 340 preferably includes at least one lowpass filter segment that isolates the signals in the 5–30 MHz range designated in the alternative embodiment for reverse path telephony signals.

It will be recalled from the discussion above that the CPU 308 in the HIU stores a service level table or data array for associating frequency assignments with particular subscribers and other information required for system maintenance. The service level table or data array comprises an array of data fields, suitable for storage in a database maintained by the HIU's CPU 308. Preferably, this table is maintained in RAM for rapid access. Furthermore, it is preferred that the table be indexed utilizing conventional database indexing methods so that the table may be rapidly search by subscriber name, subscriber address, telco DS0 number, upstream carrier frequency, etc. Use of indexed methodologies ensures rapid lookup of service level and minimized response time when a subscriber requests service.

From the foregoing, it will be understood and appreciated that the frequency agile CIU is operative for modulating telephony and other signals from a subscriber in a plurality of frequency subbands in the upstream band of a broadband subscription network so as to provide selectably variable bandwidth in the upstream band commensurate with a selected subscriber communication feature such as single voice line, multiple voice lines, ISDN, security monitoring services, and the like. In the preferred embodiment, the bandwidth is selectably allocated in discrete unit of DS0's, which will be understood can be combined to provide for higher capacity digital data channels in response to varying needs of subscribers.

Figure 8:
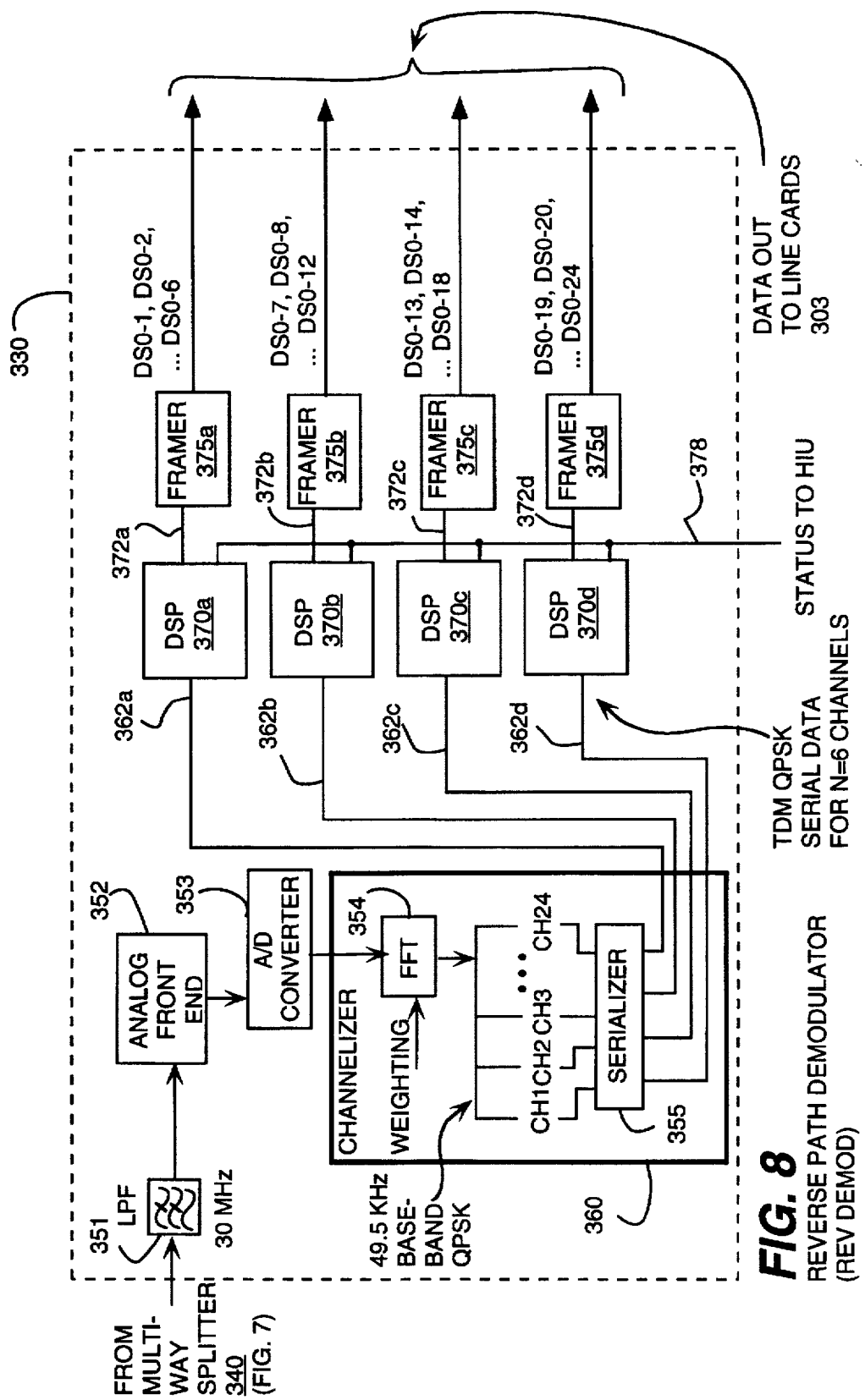
FIG. 8 is a block schematic diagram of the reverse demodulator circuit including digital signal processors (DSPs) employed in the HIU illustrated in FIG. 7.

Turning next to FIG. 8, a reverse path demodulator 330 (REV DEMOD) is operative to receive the filtered broadband signal from the multiway splitter 340 (FIG. 7), which can occur any where in the 5–30 MHz band, downconvert the center of a 1.584 MHz band comprised of 24 useful DS0 channels to DC, channelize the composite signal into 24 useful DS0 channels each having a 49.5 kHz bandwidth by weighting and FFT methods, time multiplex a group of six channels into serial form for transmission to a digital signal processor's serial port for QPSK demodulation, derive demodulated DS0 telephony signals, provide time division multiplexed DS0 telephony signals to a framer for proper telephony signal formatting, and output the selected DS0 signals to the line cards 303 (FIG. 7).

The broadband signal from the multiway splitter 340 is first provided to a low pass filter 351, which removes signal components in excess of the 30 MHz band. The output of the low pass filter 351 is then provided to an analog front end 352 which includes bandpass filters for forming sixteen 1.584 MHz subbands and mixers for downconverting the filtered signals within each subband to DC. The output of the analog front end 352 is provided to a 12-bit digital to analog (D/A) converter which samples a selected 1.584 MHz subband at 6.335 MHz and downsamples the digital signal. The output of the A/D converter is then provided to a channelizer 360 for conversion into the baseband DS0 channels.

The channelizer 360 includes a fast Fourier transform (FFT) circuit 354 that separates each of the 24 digitized DS0 signals within the 1.584 MHz subband into a separate baseband channel, CH1, CH2, . . . CH24. The FFT operates by applying predetermined weightings in the known manner to frequency shift any signals within the 1.584 MHz subband to DC. The 24 separate outputs or channels of the FFT 354 CH1, CH2, . . . CH24 are then provided to a serializer 355 that takes a group of six channels and generates a time division multiplexed serial signal on one of lines 362 that is provided as the output of the channelizer to the digital signal processors constructed in accordance with the present invention.

FIG. 3D illustrates the operation of the analog front end and channelizer in forming the baseband DS0 signals. It will be understood that any given DS0 signal can appear anywhere within the 5–30 MHz reverse band. For example, a signal identified as DS0-1 may be modulated on a carrier at 14.949 MHz, while DS0-2 may be modulated on a carrier at 29.205 MHz. The analog front end 352 and channelizer 360 are operative to downconvert any given DS0 signal to baseband, and group six DS0 channels together for transmission to a DSP for further processing. As shown in the middle part of FIG. 3D, DS0-1 may be associated with any give channel, e.g. CH3, DS0-2 with CH6, etc., and the samples of the signals in the channels serialized and time division multiplexed for further processing.

Accordingly, it will be understood that the channelizer 360 is operative to multiplex six of the QPSK-modulated 49.5 kHz baseband signals to a single DSP. The output of the channelizer 360 is alternate samples of each of the six 49.5 kHz baseband signals successively in a TDMA fashion on each of lines 362a–362d. Each serial data line 362 therefore provides time division multiple access sample digital data for demodulation of the QPSK signals at baseband.

Each of the serial data lines 362, four total, is provided to a separate digital signal processing (DSP) circuit 370; therefore, four separate DSPs 370a–370d are required to handle 24 channels. The operation of the DSPs 370 is described in greater detail below. The output of the DSPs 370 is a TDM serial stream of data provided on line 372a–372d to framer circuits 375a–375d, respectively.

Each framer circuit 375 is operative to separate the TDMA demodulated DS0 telephony data, combine it with appropriate formatting bits, check bits, etc. required for the standard DS0 telephony format, and provide serial digital signal to a connected line card 303 (FIG. 7), where the signals are coupled to the telephony network, or to such other telephony equipment as is required for further digital multiplexing and/or combination into other digital telephony formats such as DS1, DS2, etc. Thus, each framer 375 provides collects six separate DS0 signals, for example, the framer 375a collects the signals DS0-1, DS0-2, . . . DS0-6 and frames the data up for communication via the HIU bus 305 (FIG. 7) to a line card. Each framer handles six DS0s, so four framer circuits 375a–375d are provided in the demodulator 330 to handle 24 total DS0s.

The preferred DSPs 370 are ADSP2171, manufactured by Analog Devices, Inc., Norwood, Mass. Details of the preferred DSP chips are found in the literature supplied by the manufacturer. Each DSP 370 also provides a 16-bit host interface port shown on line 378 which is used to communicate signals to the database controller 308 associated with the HIU. The two asynchronous serial ports (SPORT0 and SPORT1) provided in the preferred DSPs are used to receive input data from the channelizer 360 and output data to the framer 375, respectively. In addition, an external interrupt (not shown) from the channelizer is provided to the IRQ2 input of the ADSP2171 to provide synchronization to the channelizer input.

The channelizer 360 is preferably constructed with a field programmable gate array (FPGA), and provides 16-bit input data to the DSP 370 in a 19.008 MHz serial bitstream to serial port SPORT0. The serial data clock and transmit frame synchronization signals are configured for external sourcing from the channelizer. The frame synchronization signals for SPORT0 are preferably configured for active high signals and alternate framing mode. In addition, the serial port SPORT0 is preferably configured to automatically buffer sixteen values from the serial port in a data memory circular buffer.

The DSPs 370 output data to the framers 375 in a 24 word time-division multiplexed serial bitstream. The output serial port SPORT1 is configured for multichannel operation on all DSPs. A 2.592 MHz clock for the multichannel serial bitstream from the DSP is preferably generated externally by the channelizer FPGA 360. A Receive Frame Synchronization (RFS) signal is generated by the first DSP 370a, and the remaining DSPs 370b, 370c, and 370d are initialized for external sourcing of the RFS signal from the first DSP 370a. The RFS signal is configured to be active high and for a multichannel frame delay of zero. Each DSP is configured to source data for six of the 24 channels, and provide 3-bit output data consisting of 2 data bits and one status bit.

Still referring to FIG. 8, the host interface port 378 of each DSP 370 is used to boot the DSP and to send channel status information to the HIU database controller 308 (FIG. 7). To receive channel status information, the database controller 308 writes a request into a data register HDR0 within the DSP and waits for a response from the DSP. The DSP firmware responds to a request at most once per 36 kHz cycle. The response will consist of channel status information written to DSP data registers HDR0 through HDR5.

At least three sources of interrupts are used on the DSPs 370:SPORT1 Receive Buffer Full, SPORT0 Transmit Buffer Empty, and IRQ2. As mentioned, the IRQ2 interrupt is used to synchronize the input data with the channelizer.

Figure 9:
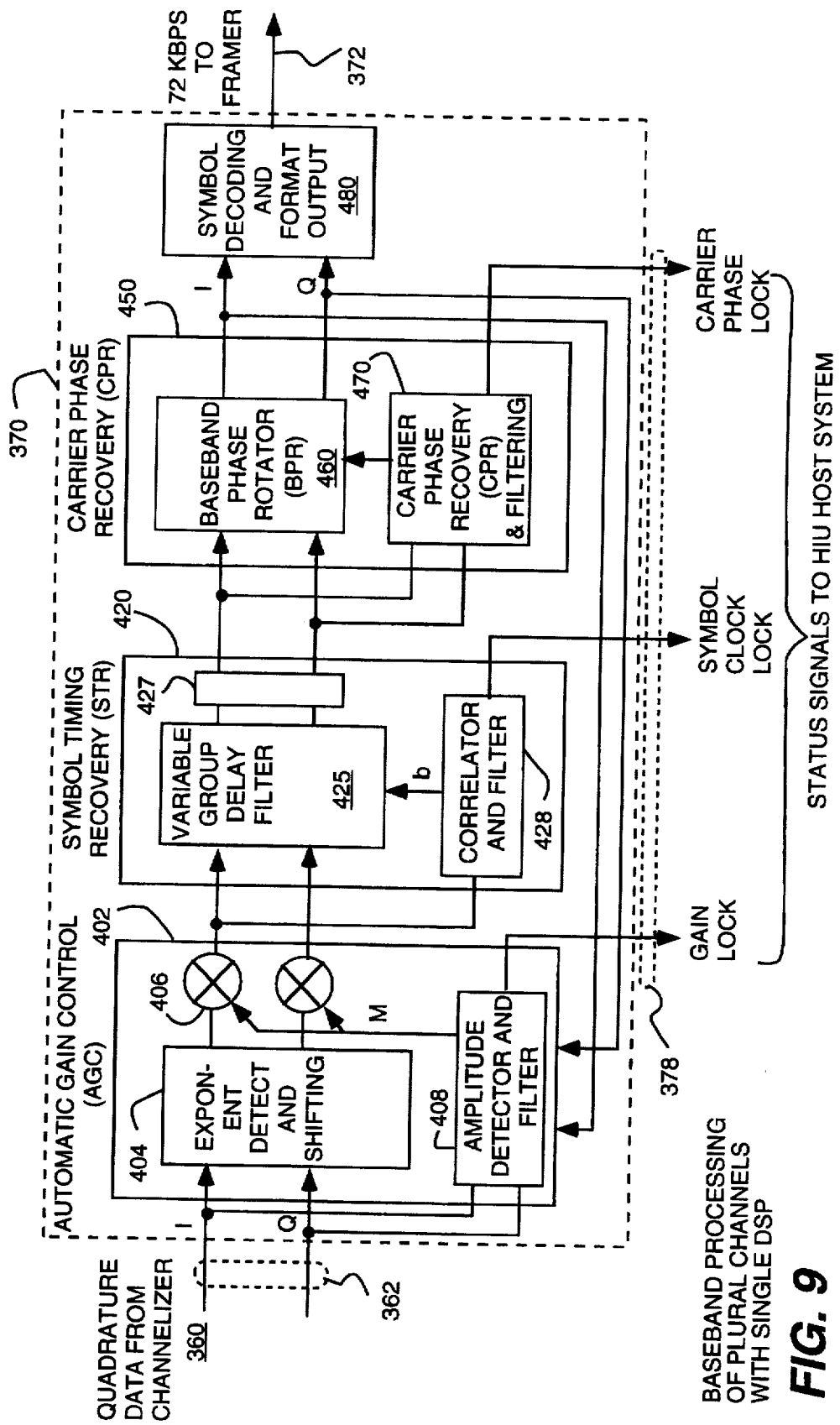
FIG. 9 is a block functional diagram illustrating the principal baseband processing methods carried out by the DSP in the reverse demodulator circuit of FIG. 8.

FIG. 9 illustrates the basic functions carried out within each of the DSPs 370 to provide for baseband processing of plural channels. Briefly stated, each DSP carries out the functions of automatic gain control (AGC), symbol timing recovery (STR), and carrier phase recovery (CPR), for each of six baseband DS0 channels. These functions are carried in a TDM fashion on quadrature I and Q data values provided from the channelizer 360. All incoming I and Q data values are stored in the internal data memory of the preferred DSP 370. In addition, the sine and cosine values employed in the baseband phase rotator portion of carrier phase recovery are stored in the internal program memory of the DSP.

In FIG. 9, the automatic gain control functional block comprises an exponent detection and shifting component 404, a multiplier 406, and an amplitude detector and filter 408. The amplitude detector and filter generates a multiplication factor M that is provided to the multipliers 406.

After the signals from the channelizer 360 are adjusted for gain by the AGC circuit 402, they are provided to a symbol timing recovery (STR) function 420. The STR function 420 comprises a variable group delay filter 425 and a correlator 428 that generates a filter coefficient b that is provided to the variable group delay (VGD) filter 425. The output of the variable group delay filter in the STR block is downsampled by two and then provided to a carrier phase recovery (CPR) function 450, which is operative to lock to the carrier frequency in a conventional phase lock loop fashion. The CPR function 450 includes a baseband phase rotator (BPR 460) that adjusts the phase difference between the phase of the input I and Q values and the phase of the QPSK carrier.

Also, the CPR function 450 comprises a carrier phase recovery (CPR) function 470, which is operative to detect and lock to the QPSK carrier and adjust for frequency variations that might occur between the receiver's local oscillator and the carrier oscillator.

The outputs of the CPR function 450 are separate I and Q values at one sample per symbol rate from the baseband DS0 signal that are then provided to a symbol decoding and differential phase decoding function 480 that is operative to derive the DS0 data, frame it, and format it appropriately as an output on line 372 at 72 kbits/sec to the framer circuit 375 (FIG. 8).

The arithmetic functions provided for the preferred DSP 370 in 1.15 fixed format, i.e. the numbers have one sign bit and 15 fractional bits; therefore, during processing numbers can range from $-1$ to $1-2^{-15}$. In order to perform the calculations for the functions inside DSP correctly without any overflow, at some points during processing the inputs or outputs of some of these functions may need to be shifted. The nominal amplitude level at different points of processing are summarized in Table 2 below:

TABLE 2

| Nominal Amplitude level throughout processing | |
|---|---|
| Processing section | Nominal level |
| Shifter input | $2^{-7}$ |
| Shifter output | $2^{-1}$ |
| Multiplier output | $2^{-3}$ |
| AGC filter output, M | $2^{-2}$ |
| STR filter output, b | $2^0$ |
| Phase accumulator output in BPR | $2^0$ |

The nominal input data level for all the functions succeeding the multiplier is $2^{-3}$; therefore, the AGC filter output M must be shifted left by 1 so that the nominal value of M sent to multiplier is $2^{-2}$. The STR correlator filter output, b, must be shifted left by 3 so that the maximum value of b sent to variable group delay filter is 1. The phase accumulator output in BPR is also shifted left by 3 to limit the maximum phase to 1 cycle/sec, which corresponds to a hexadecimal value of EFFF for addressing the sine and cosine values in the lookup table.

The DSP 370 receives samples at 72 Ksamples/sec from the channelizer on line 362 through its serial port and performs five tasks. These tasks are as follows: carrier phase recovery, symbol timing recovery, automatic gain control, decoding and formatting the symbol decisions, and providing various information about each channel through host interface port 378 to the HIU processor. The symbol decisions are formatted and sent to the framer on line 372 by a second serial port. Each DSP is capable of performing the tasks for 6 channels; therefore, for all 24 channels, four DSP's are required.

Figure 10:
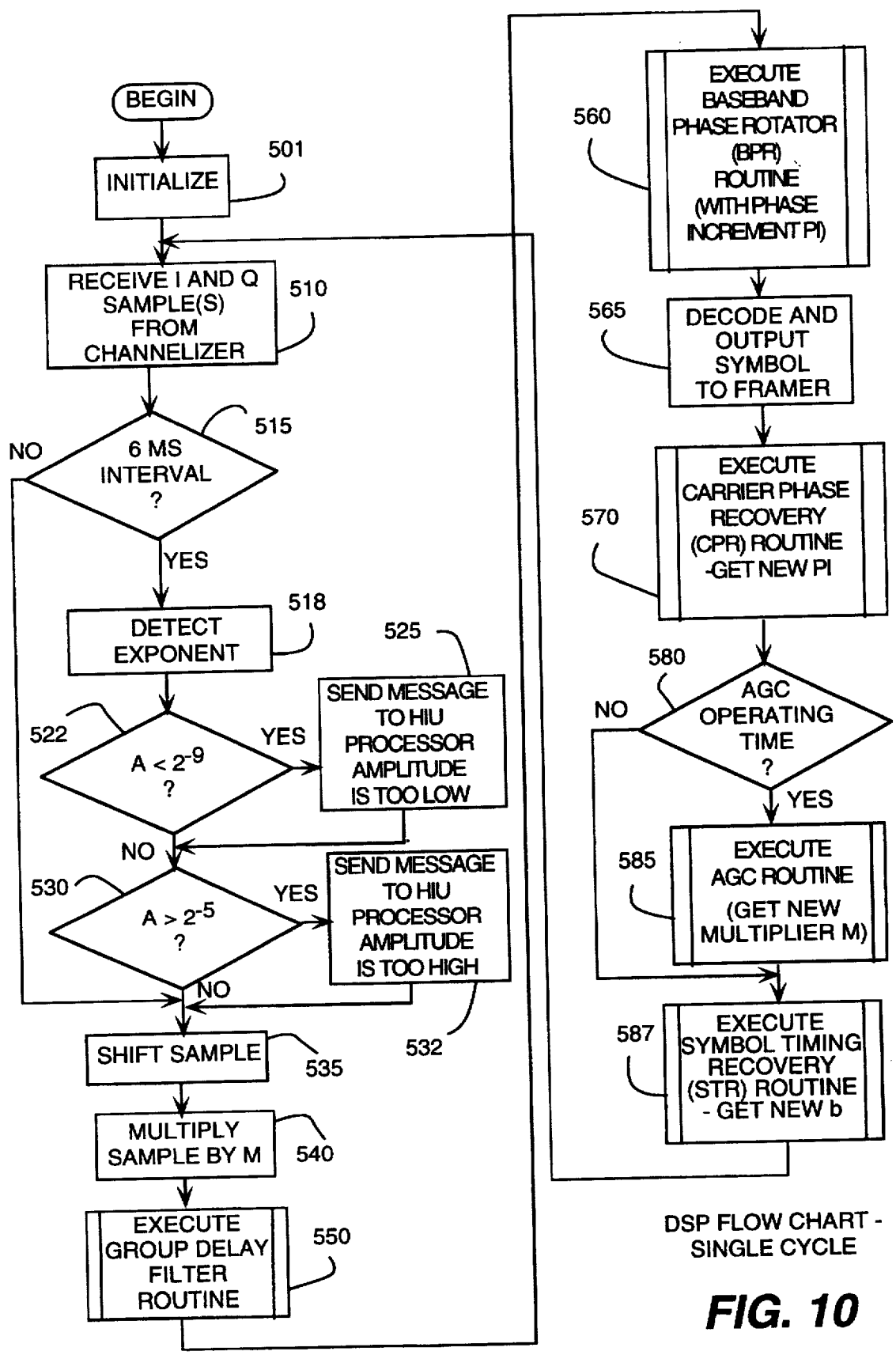
FIG. 10 is a flow chart illustrating the steps taken in the program for the DSP to carry out the baseband processing methods shown in FIG. 9.

FIG. 10 is a flow chart illustrating the sequence of operations taken by each DSP 370 to carry out the baseband processing functions described above. Those skilled in the art will understand that the steps shown in FIG. 10 are implemented as the software for the DSP, and is preferably stored in the internal program memory for the DSP. It will be understood that the steps described are taken for all six (6) DS0 channels being processed, in time division multiplexed fashion. Each described processing function is performed for all channels before processing of the next function, to save overhead in coding of the DSP.

Starting at step 501, the first step taken is to initialize the DSP upon boot-up and to clear all internal registers and memory locations. At step 510, a digital sample of the I and Q values is read from the channelizer for the six channels.

At step 515, an inquiry is made whether a 6 millisecond (ms) interval has passed, indicating that it is time to conduct an automatic gain control function, the AGC function preferably being carried out every 6 ms. If a 6 ms period has not expired, the "no" branch is taken to step 535, discussed below. If the 6 ms period has expired, the "yes" branch is taken to step 518.

At step 518, steps required to implement the AGC functions (402 in FIG. 9) are initiated. At step 518, the exponent of the I and Q sample values is detected, and an inquiry is made at step 522 whether the amplitude A of the detected signal is less than $2^{-9}$, which would require that the values must be fight-shifted more than six places. If so, the "yes" branch is taken to step 525, where a message is sent to the HIU processor that the amplitude of the incoming signals is too low. This can be indicative of noise in the channel or other signal degradation. The HIU processor may respond by changing the frequency for a given DS0 or by ordering a selected CIU transmitter to increase its transmitter power.

If the detected signal level is not less than $2^{-9}$, or after sending a message the amplitude is too low, the inquiry is made at step 530 whether the detected signal level A is greater than $2^{-5}$, indicating a shifting factor greater than three places. If so, the "yes" branch is taken to step 532, where a message is sent to the HIU processor that the amplitude of the incoming samples is too high. The HIU processor may respond by changing the frequency for a given DS0 or by ordering a selected CIU transmitter to decrease its transmitter power.

If the "yes" branch was taken from step 515, or if the detected signal level at step 530 is less than $2^{-5}$ and greater than $2^{-9}$, the "no" branch is taken to step 535, where the sample values are shifted in an appropriate amount left or right to provide for gain shifting.

At step 540, the I and Q samples are multiplied by a multiplication factor M provided by an amplitude detecting and filtering method described in greater detail below. The I and Q values after the AGC functions are then provided to steps involved in symbol timing recovery (420 in FIG. 9).

The first step taken for symbol timing recovery is shown at step 550. At this step, a routine to execute a group delay filter is executed. This involves steps shown in greater detail below. After executing the group delay filter, the I and Q values are utilized in carrier phase recovery function (450 in FIG. 9). The first step taken for carrier phase recovery is to execute a baseband phase rotator (BPR) routine 560, utilizing a phase increment value PI provided from a carrier phase recovery (CPR) routine (470 in FIG. 9).

After the baseband phase rotator step at 560, the I and Q values from the BPR step are provided to the symbol decoding and formatting steps shown at 565 (which corresponds to the function 480 shown in FIG. 9), wherein a decoded symbol is transmitted to the framer circuit. After the symbol is output to the framer, the carrier phase recovery (CPR) routine 570 is executed to derive a new phase increment PI.

After executing the CPR routine at step 570, an inquiry is made at step 580 whether a predetermined time period has elapsed for carrying out automatic gain control functions. The predetermined time period in the preferred embodiment is 10 symbol periods. If the predetermined time period has not elapsed, the "no" branch is taken from 580 to step 587, where the symbol timing recovery routine (STR) is carried out to determine a new value of the filter coefficient b. If the predetermined time period has elapsed, the "yes" branch is taken to step 585, where the AGC control routine is executed to obtain a new multiplier M. Control then passes to step 587.

After step 587, the program loops back to step 510 for receipt and handling of the next I and Q values.

The foregoing general flow diagram may be broken down into a number of separate subroutines, which will be described next.

Automatic Gain Control (AGC) Functions

Figure 11:
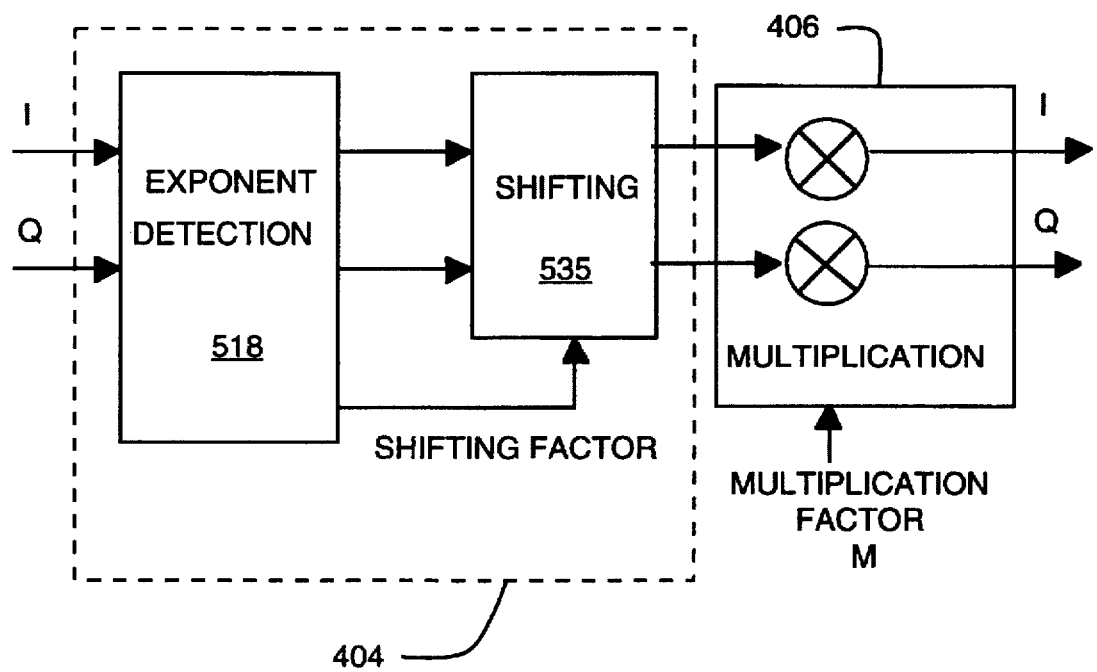
FIG. 11 shows the input multiplication functions utilized in the preferred baseband processing methods.

Turning next to FIG. 11, the automatic gain control (AGC) function 402 comprises the basic steps of detecting the exponent of the input samples, shifting, and then multiplying the samples by a gain multiplying factor M that is derived periodically (every 10 symbol periods in the disclosed embodiment).

The automatic gain control functions adjust the system gain by first finding the exponent for a block of incoming data, determining if the input amplitudes are too high or too low, and adjusting the gain using a shifter and a multiplier. The shifter output amplitude level is preferably somewhere between 0.5 to 2 times the nominal input signal level. Preferably, further steps are taken for peak detection and filtering to eliminate any residual amplitude error by multiplying the output of shifting operation by the estimated multiplication factor M.

The incoming I, Q values from the channelizer are 16 bit words with the nominal value of $2^{-7}-2^{-8}$ for positive signals and $-2^{-7}$ for negative signals, but these signals may have higher or lower amplitudes depending on the amount of the transmitted power and the channel gain loss or noise. As long as the absolute value of the signal amplitude is between $2^{-9}$ and $2^{-5}$, the incoming signal is reliable. If signal amplitude is below $2^{-9}$ or above $2^{-5}$, the AGC reports the signal to the HIU processor. First, the exponent of the signal amplitude A is determined. Assuming that the incoming signal level from channelizer is between $2^{-9}$ and $2^{-5}$, an appropriate shifting operation is done such that the nominal value of the signal out of the shifter is $2^{-1}$. In the preferred embodiment, the exponent in a block of data containing eight in_phase (I) and eight quadrature (Q) values is found by averaging $I^2+Q^2$, and then using a lookup table to pick the appropriate shifting factor such that the nominal value of the signal level out of the shifter is $2^{-1}$ In other words:

If $\frac{1}{9} \sum_{0}^{8} I^2 + Q^2 < 2^{-9}$  ⟹ send a message that the amplitude is too low If $\frac{1}{9} \sum_{0}^{8} I^2 + Q^2 > 2^{-5}$  ⟹ send a message that the amplitude is too high If $2^{-9} < \frac{1}{9} \sum_{0}^{8} I^2 + Q^2 < 2^{-5}$ ⟹ data is sent to shifter The signal amplitude level in the DSP after the shifting operation is limited to upper and lower limits:

$2^{-2} \leq$ amplitude after shifting $\leq 1$ which corresponds to signal levels of:

$(2^{-1} \times$nominal value$) \leq$ amplitude after shifting $\leq (2 \times$nominal value$)$ It will be understood that finding the shift factor is done only at initialization, but shifting is done on all incoming samples throughout the processing. The output of the shifter function 535 is the input to the multiplier 540 (FIG. 10). The multiplication factor in the DSP is:

$2^{-3} \leq M$ (Multiplication factor) $\leq 2^{-1}$

The initial value of the multiplication factor is $2^{-2}$; therefore, the multiplier output range is:

$2^{-4} \leq$ amplitude after multiplication $\leq 2^{-2}$

The nominal amplitude out of the multiplier is $2^{-3}$; therefore, the multiplication operation corresponds to:

$(0.5 \times$nominal value$) \leq$ amplitude after multiplication $\leq (2 \times$nominal value$)$ The multiplication factor M is updated by the AGC amplitude detection and filtering function (408 in FIG. 9). The residual amplitude error will be eliminated after AGC reaches the steady state.

Figure 12:
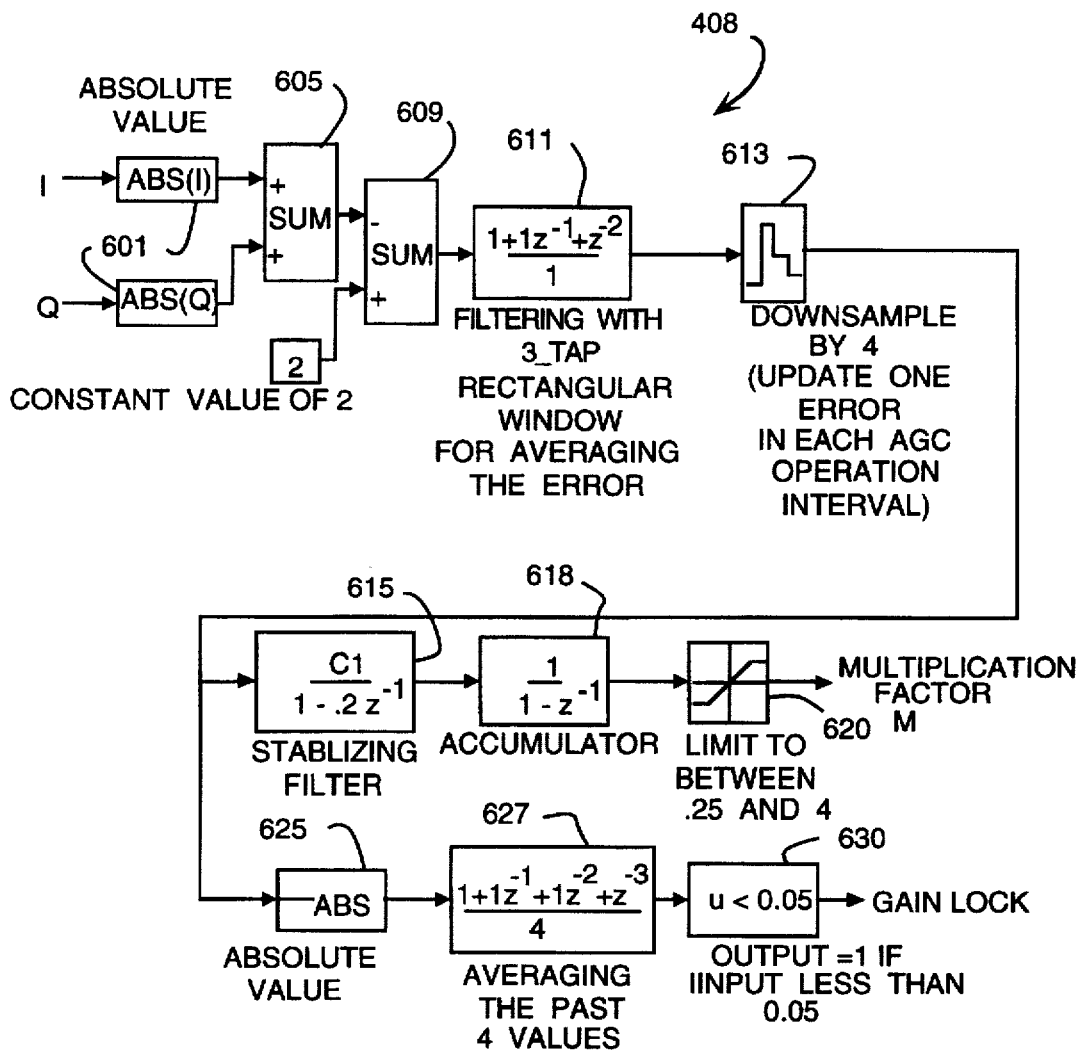
FIG. 12 shows the amplitude detection and filtering functions utilized in the preferred baseband processing methods.

FIG. 12 illustrates the steps taken to implement the program for the amplitude detection and filtering process 408 described in connection with FIG. 9 (585 in FIG. 10). When considering this figure, it should be understood that in every 10 symbol periods, one STR update and one AGC update take place. The STR update algorithm occupies the first 4 symbol periods and the AGC update algorithm occupies the other 6 symbol periods.

In determining the amplitude, at 601 the absolute values of the in_phase (I) and quadrature signals (Q) from the multiplication 406 (FIG. 11) are normalized to 1 by summing their values at 605. Then, an amplitude error is determined at 609 by first subtracting the absolute values of the in_phase (I) and quadrature signals (Q) from 2. The error term is then averaged at step 611 over 3 past values using a 3 tap rectangular window to output an averaged error. The signal is downsampled by 10 at step 613.

The averaged error is input to a stabilizing filter at 615. The gain of the stabilizing filter is C1=0.11 in the first 4.2 milliseconds (150 symbol periods) for fast convergence of the amplitude level during the acquisition time. After the first 4.2 milliseconds, the gain is changed to C1=0.05 to minimize the low amplitude jitter at steady state. The stabilizing filter output is accumulated at 618 to generate the multiplication factor M that is limited to between 0.25 and 4, i.e. the values are clipped to these limits at 620. The multiplication factor M is provided to the multiplication stage 406.

A GAIN LOCK signal for the channel being processed is produced by steps starting at 625. At step 625, the absolute value of the average amplitude error is determined. At step 627, the average of the absolute value of the past four amplitude error values is determined. At step 630, this average is compared to a threshold value u, which corresponds to an amplitude error of about 2.5 % of the ideal amplitude level. Note that the nominal preferred threshold value of 0.05 corresponds to a amplitude of 2 ($I_n + Q_n = 2$). The initial value of the accumulator is $2^{-2}$, which corresponds to a normalized nominal value of 1. This value is preferably updated once in the AGC operating time interval (or every 10 symbol periods). If the average exceeds the threshold value, the GAIN LOCK signal is true for the channel, and this signal is provided to the HIU processor as status information as to the channel.

Symbol Timing Recovery (STR) Methods

Figure 13:
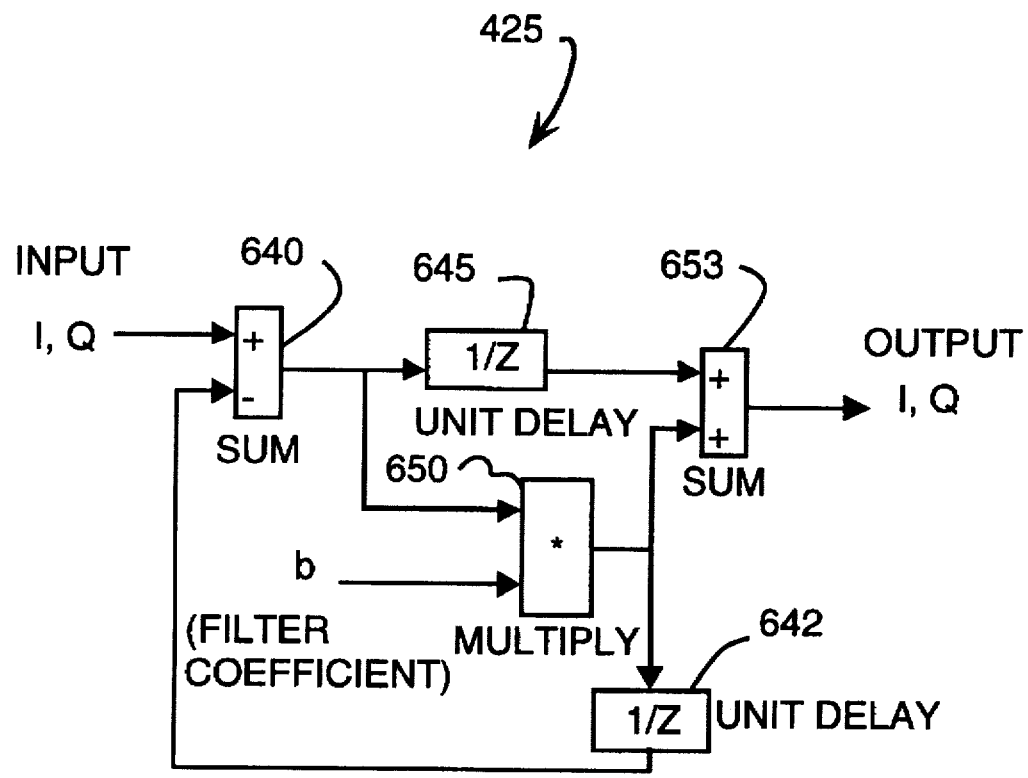
FIG. 13 shows the variable group delay (VGD) filter functions utilized in the preferred baseband processing methods.

Returning for a moment to FIG. 9, after the automatic gain control (AGC) processing 402 comes the symbol timing recovery (STR) processing 420. Turning next to FIG. 13, the first processing to occur within the STR stages is the variable group delay filter (VGDF) 425.

First, it will be recalled that the STR methods involve the VGDF function 425 and a correlation and filtering function 428 that determines a filter coefficient b that is used to delay the incoming signal from the channelizer 360 such that the sampling would be at the symbol instants. Second, the STR methods are carried during a predetermined operating interval measured in symbol periods.

The STR operating time interval is defined as the time that STR algorithm is estimating the b value. The first 6 symbol periods inside every 10 symbol period interval is the STR operation time. The other 4 symbol period interval is the time for operation of the AGC (amplitude detection and filtering) algorithm, described above. During the STR time, the output of the AGC algorithm is held constant and equal to the last AGC filter output before the start of the STR operating time interval. During the AGC time, the output of the STR algorithm is held constant and equal to the last STR algorithm output before the previous STR operating time interval ended.

The symbol timing recovery (STR) function (420 in FIG. 9)(587 in FIG. 10) is operative to extract timing information in the form of a group delay, and the variable group delay filter to delay the input data (at 2 samples per symbol rate) such that the sampling will be at symbol instants.

The variable group delay filter 425 is a first order allpass filter with a variable coefficient b. The transfer function for this filter is:

$H(z) = (b + z^{-1})/(1 + bz^{-1})$

By changing the value of b, the filter introduces different group delays without changing the gain. In FIG. 13, the filter 425 is implemented by summing the input I or Q value at 640 with the fed-back value from a $z^{-1}$ unit delay 642, subjecting the sum to a second $z^{-1}$ unit delay 645, multiplying the sum with the filter coefficient b at 650, and adding the operations of the multiplication results and the delayed sum at 653.

Figure 14:
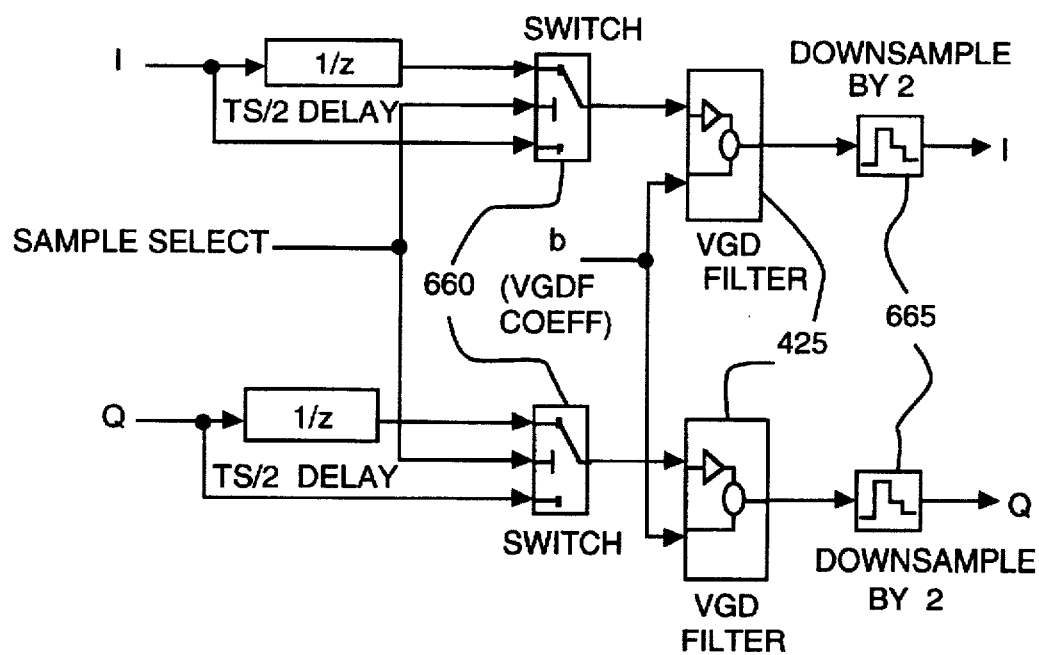
FIG. 14 shows the delay insertion, VGD filter, and down-sampling functions utilized in the preferred baseband processing methods.

Referring now to FIG. 14, the VGD filtering is done on both in_phase (I) and quadrature input (Q) signals at 2 samples per symbol rate. A SAMPLE SELECT signal, generated by the symbol timing recovery function (FIG. 15), is employed at a switch 660 to select whether the input signal to the variable group delay filter 425 is delayed by half a symbol period or not. The switch is preferably implemented with selectable storage registers within the DSP. The output of the filter 425 is then downsampled by 2 at step 665 to reach the symbol rate.

In the preferred embodiment, a group delay for the coefficient b of b=0 corresponds to a delay of half a symbol period, while b=1 corresponds to a zero delay. Since b is the value of the pole, it must be less than 1, and for b<−0.045, the allpass filter shows phase nonlinearity. Thus, b is preferably limited by upper and lower bounds: $-0.045 \leq b \leq 0.96$. For this range of b, the group delay of the filter is almost constant in the band of interest. This range of b corresponds to a delay range of:

$$0.01 \times Tsymb \leq \tau \leq 0.55 \times Tsymb$$

where Tsymb is the symbol timing offset. If the symbol timing offset is outside this range, the SAMPLE SELECT signal will toggle its previous value to cause a delay (or advance, depending on the previous value of sample select) of Tsymb/2 to accommodate for all symbol timing offsets from zero to Tsymb. At the same time, the value of b will be changed such that the new value of b and the inserted Tsymb/2 delay (or advance) correspond to the same symbol timing offset:

$$\text{SAMPLE SELECT toggles} => 0.51 \times Tsymb \leq \tau \leq 1.05 \times Tsymb$$

The preferred initial value of b used for processing is b=0.6. This value corresponds to $\tau=0.133 \times Tsymb$ or $\tau=0.633 \times Tsymb$ (depending on whether the selected sample is $x_n$ or $x_{n-1}$). The initial value of b=0.6 is chosen to be somewhere close to the midpoint between b=−0.045 and b=0.96 to prevent the possibility of initial oscillation of the SAMPLE SELECT signal which may be due to initial noise from other control loops and also to decrease the acquisition time for all possible timing offset values.

Figure 15:
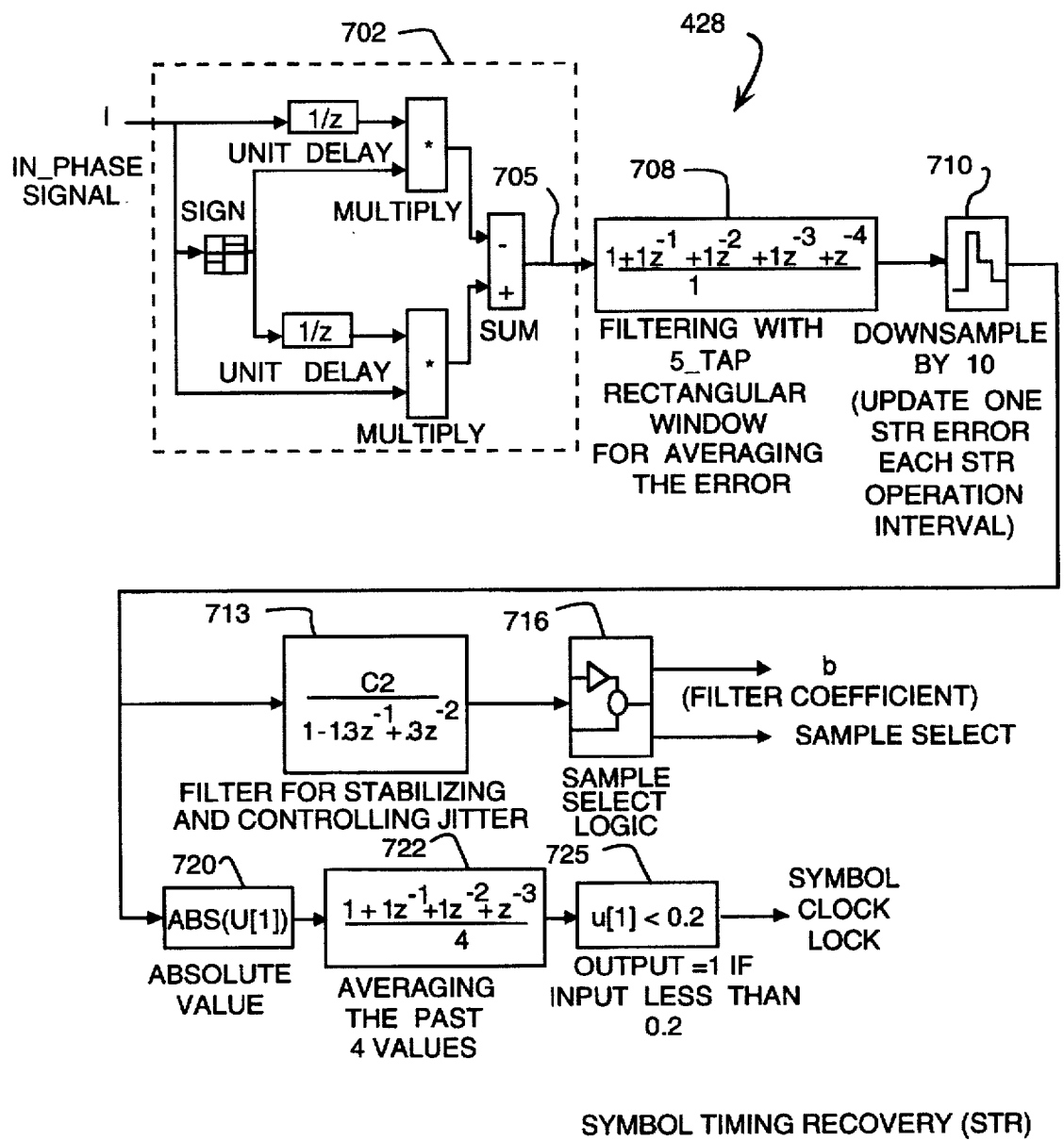
FIG. 15 shows the symbol timing recovery (STR) functions utilized in the preferred baseband processing methods.

The correlator function 428 of the symbol timing recovery (STR) function 420 is shown in FIG. 15. The method employed is a minimum variance error algorithm based on the work of Mueller and Müller. The known Mueller and Müller method works on one sample per symbol rate. The timing information is derived from the symmetry error of the sampled impulse response by extracting the correlation between every two consecutive sample values and their estimates. However, the present invention differs from the Mueller and Müller approach as follows: instead of IIR filtering the correlator output at the symbol rate, in the present invention the correlator output is averaged over a number of symbol periods (five in the preferred embodiment), and the IIR filtering is conducted at 1/6 of the symbol rate. This decreases the required processing power for STR functions such as IIR filtering, updating the value of the filter coefficient b, and generating the SAMPLE SELECT signal since they now may be effected six times more slowly.

The correlator 428 uses the new in_phase symbol $I_n$, and the previous in_phase symbol $I_{n-1}$ to generate an error signal at line 705 that is related to the timing offset between the symbol clocks in the transmitter and receiver. The correlator performs the following calculations shown at the block 702 to generate the error signal:

$$E(n) = I_n \times \text{sign}(I_{n-1}) + I_{n-1} \times \text{sign}(I_{n-1})$$

This error will be averaged at step 708 with a 5 tap rectangular window to reduce the effect of noise from other control loops on the symbol timing recovery loop during acquisition time. This filtering is done at the symbol rate by averaging a block containing 5 past input error values E(n−5) ... E(n−1). At the next STR operation interval, the window slides over the next block of past inputs. Therefore, one averaged output is produced once in each STR operation time interval (i.e., every 10 symbol periods), as shown at step 710 by downsampling by 10.

The averaged error then is sent to a two-pole IIR filter at step 713 for loop stabilization and timing jitter control. The gain C2 of this filter is set to C2=0.115 during the first 4 milliseconds for fast convergence of the loop during acquisition time. After the first 4.2 milliseconds, the gain value is set to C2=0.03 to reduce the timing jitter at steady state. The output of the IIR filter 713 is then sent to a sample select logic 716 to determine the coefficient value b for the variable group delay filter and the SAMPLE SELECT signal. A summary of the operations of IIR filter and sample select logic is as follows:

u = input to the sample select logic
b = output of the sample select logic to be sent to the VGD filter
e_str = averaged STR error input to the IIR filter
SAMPLE SELECT = output of the sample select logic 716
$u(n) = C2 \times e\_str(n) + 1.3 \times b(n-1) - .3 \times b(n-2)$
If ($u_n \leq -.045$) OR ($u_n \geq .96$) ==> toggle SAMPLE SELECT signal
Else ==> SAMPLE SELECT(n) = SAMPLE SELECT(n−1)
If $u_{n-1} \leq -.045$ ==> $b_n = u_n + 0.8$
Elseif $u_{n-1} \leq 0.96$ ==> $b_n = u_n - 0.95$
Else ==> $b_n = u_n$ The bottom blocks 720, 722, 725 in FIG. 15 are used for generation of a symbol timing lock signal SYMBOL CLOCK LOCK. This signal is generated by determining the absolute value of the error values out of the downsampler 710 at step 720, averaging the absolute value of the past 4 error values at step 722, and comparing the average at step 725 to a threshold value. If at step 725 the absolute value of this averaged error is less than 0.2, the timing offset is approximately within 5 percent of the symbol period, which indicates that the symbol timing is locked. The initial output value of the sample select logic 716 to the variable group delay filter is b=0.6, and SAMPLE SELECT is initial set to zero.

Carrier Phase Recovery (CPR) Methods)

Figure 16:
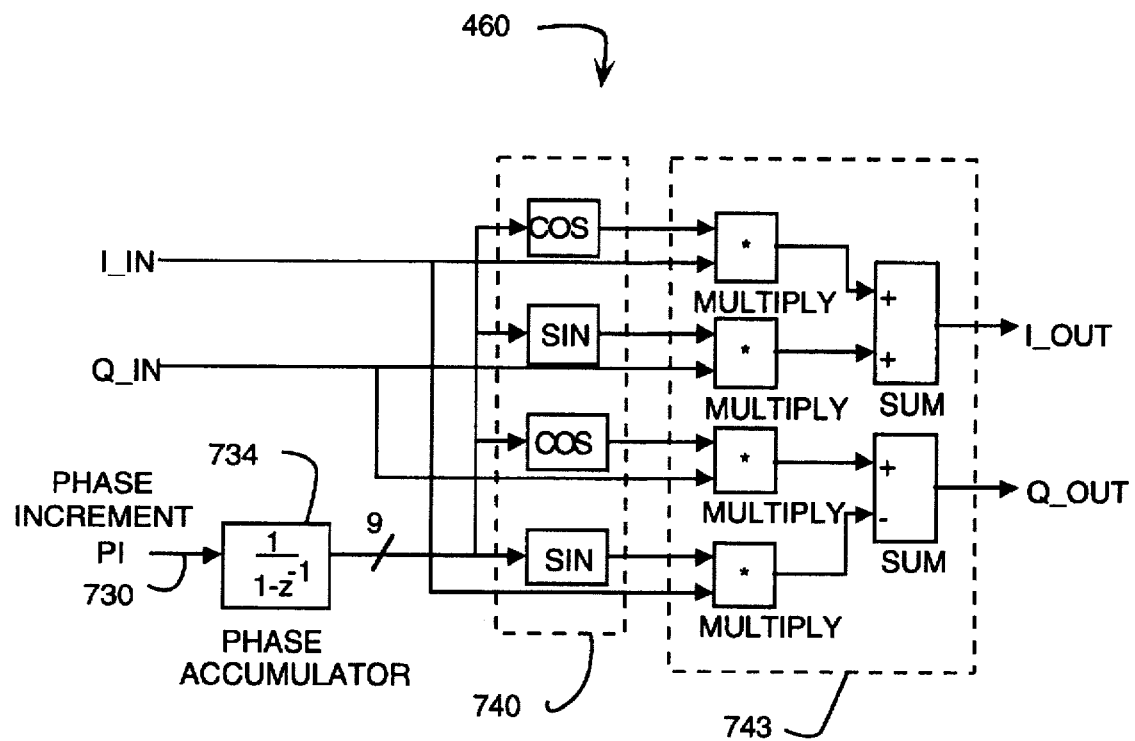
FIG. 16 shows the baseband phase rotator (BPR) functions utilized in the preferred baseband processing methods.

Turn next to FIG. 16 for a discussion of the carrier phase recovery (CPR) processes (450 in FIG. 9), which comprises a baseband phase rotator process (BPR) 460 and a phase lock loop 470. The carrier phase recovery 450 takes the residual carrier phase from the complex baseband signal by estimating the residual phase using a phase lock loop (also known as a Costas loop) and rotating the phase of the complex waveform with the baseband phase rotator (BPR).

The baseband phase rotator 460 receives a phase increment (PI) value at 730 from the phase lock loop and accumulates the phase increments at step 734 to generate the residual carrier phase values at the symbol rate. This value is then quantized to 9 bits to form an address for a sine and cosine table 740 that is stored in the program memory of the preferred DSP. The phase resolution is defined by:

$$\text{Phase resolution} = 2\pi \times LSB = 2\pi \times 2^{-9} = 0.012272 \text{ radians}$$

This resolution results in a maximum symbol error of −44.2 dB and an rms symbol error of about −63 dB. The number of sine and cosine points stored in the program memory is 640, which corresponds to 1.25 cycles of a sine waveform, $1.25 \times 2^9 = 640$. Since $\cos\theta = \sin(\pi/2+\theta)$, the address for the cosine values are obtained by adding $512/4=128$ to the address of the sine values. The sine and cosine values are used to rotate the complex waveform by estimated residual carrier phase by the following calculations carried out in steps 743:

$$I_{out} = I_{in} \times \cos(\text{PHASE}) + Q_{in} \times \sin(\text{PHASE})$$

$$Q_{out} = Q_{in} \times \cos(\text{PHASE}) - I_{in} \times \sin(\text{PHASE})$$

As shown in FIG. 9, the phase-rotated I and Q are provided to the phase lock loop function 470.

Figure 17:
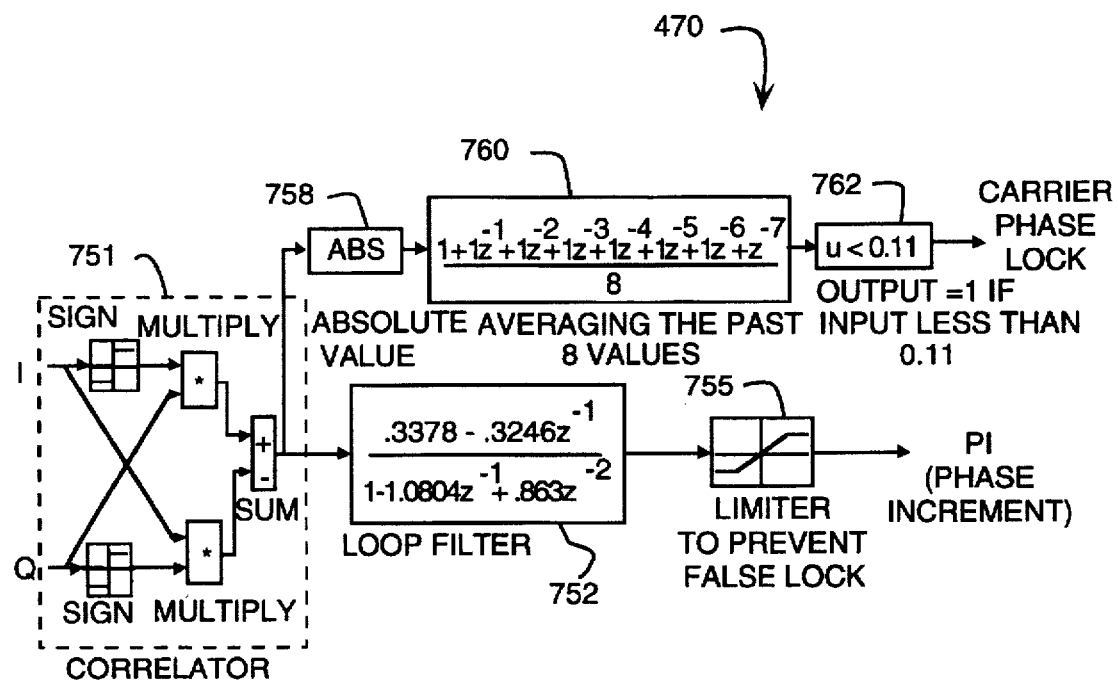
FIG. 17 shows the phase lock loop and carrier phase lock (CPR) detection functions utilized in the preferred baseband processing methods.

Turning now to FIG. 17, the phase lock loop function 470 is operative to determine when the system is locked to the carrier, indicated by the signal CARRIER PHASE LOCK, and to generate the phase increment signal PI. The in_phase I and quadrature Q components from the BPR 460 are input to the phase lock loop at the symbol rate to produce an error term by step 751 which is passed on to a loop filter 752. The output of the loop filter is the phase increment value PI to be used in baseband phase rotator.

A limiter block 755 is used to prevent a false lock. If the carrier phase error is such that the phase increment value goes beyond 90 degrees for QPSK, a symbol that represents a point on the constellation may rotate to another point on constellation and be detected falsely as a correct decision. To prevent this false lock for QPSK modulation techniques, the phase increment value must be limited to some threshold value which is less than 90 degrees. The threshold value used in the preferred embodiment is ±30 degrees, which corresponds to a 3 kHz offset of the local oscillator with the reference frequency:

$$\pi/6 \text{ radians} = 2\pi \times 3 \text{ kHz/Symbol Rate.}$$

The estimated error values from steps 751 are sent to the loop filter 752 to generate a phase increment value. The bandwidth of the closed loop transfer function of the loop filter is about 1 kHz, which means that loop can track a phase jitter with a frequency below 1 kHz. Further, the absolute value of the error values from step 751 is determined at step 758 and averaged at step 760 over the past 8 values. This average is compared at step 762 with a threshold value of 0.11, which corresponds to a phase error of 12.7 degrees. If the averaged error is below this threshold, the carrier phase is deemed locked. A lock indication signal CARRIER PHASE LOCK is then generated and passed to the HIU host system through the host interface port. The phase increment output PI of the phase lock loop is input to the baseband phase rotator section at the symbol rate.

Decoding and Formatting

The final stage of the baseband processing is symbol decoding, differential phase decoding, and formatting, shown at 480 in FIG. 9 (565 in FIG. 10). Symbol decoding of course entails demodulating the QPSK modulated DS0 signal and determining the instantaneous values of the signal. As will be recalled from prior discussion, the I and Q input at the modulator are encoded by differential phase encoding to eliminate the phase ambiguity of the received symbols. Therefore, the received I and Q must be differentially phase decoded. First, the output of the BPR process 460 are mapped to binary decisions, A and B. For QPSK, the mapping is a simple operation:

If $I_{BPR} > 0 \rightarrow A=1$

If $I_{BPR} \leq 0 \rightarrow A=0$

If $Q_{BPR} > 0 \rightarrow B=1$

If $Q_{BPR} \leq 0 \rightarrow B=0$

The differential encoder takes the present and previous values of A and B and maps them into binary symbol decisions $I_{out}$ and $Q_{out}$. The truth table for the mapping function of the differential decoder is shown in Table 3 below:

TABLE 3 mapping function of the differential decoder

| $A_{n-1}$ | $B_{n-1}$ | $A_n$ | $B_n$ | $I_{out}$ | $Q_{out}$ |
|---|---|---|---|---|---|
| 0 | 0 | 0 | 0 | 1 | 1 |
| 0 | 0 | 0 | 1 | 0 | 0 |
| 0 | 0 | 1 | 0 | 1 | 0 |
| 0 | 0 | 1 | 1 | 0 | 1 |
| 0 | 1 | 0 | 0 | 1 | 0 |
| 0 | 1 | 0 | 1 | 1 | 1 |
| 0 | 1 | 1 | 0 | 0 | 1 |
| 0 | 1 | 1 | 1 | 0 | 0 |
| 1 | 0 | 0 | 0 | 0 | 0 |
| 1 | 0 | 0 | 1 | 0 | 1 |
| 1 | 0 | 1 | 0 | 1 | 1 |
| 1 | 0 | 1 | 1 | 1 | 0 |
| 1 | 1 | 0 | 0 | 0 | 1 |
| 1 | 1 | 0 | 1 | 1 | 0 |
| 1 | 1 | 1 | 0 | 0 | 0 |
| 1 | 1 | 1 | 1 | 1 | 1 |

The values of $I_{out}$ and $Q_{out}$ are preferably obtained by a 16-word look up table located in program memory of the DSP. Each word is formatted as a 3 bit words. The MSB corresponds to $I_{out}$, the next bit corresponds to $Q_{out}$ and the LSB is zero or can be used as a status bit. The presence of the third bit is inevitable since the minimum word length for the preferred DSP circuit's serial ports is 3.

FIG. 18 illustrates the timing of the various routines of the shifter, multiplier, VGDF, BPR, phase lock loop, STR, and symbol decoding. Taking in conjunction with the flow chart of FIG. 10, those skilled in the art will be enabled to program the preferred DSP utilized in the disclosed embodiment to carry out the invention.

While there has been shown and described the preferred embodiments of the invention, it will be evident to those skilled in the art that various modifications and changes may be made thereto without departing from the spirit and scope of the invention as set forth in the appended claims and equivalents thereof.

What is claimed is:

1. A system for coupling telephony signals communicated via a broadband communication network from a subscriber to a telephony network interface, comprising:

a plurality of frequency converter circuits for converting telephony signals modulated at selected carrier frequencies in the broadband network to a baseband frequency;

a channelizer for collecting a plurality of composite telephony signals from the frequency converter circuits and providing time division multiple access (TDMA) sampled signals corresponding to the modulated telephony signals at baseband;

a baseband demodulator for demodulating the TDMA sampled signals and deriving demodulated telephony signals; and an output interface for coupling the demodulated telephony signals to a telephony network.

2. The system of claim 1, wherein the baseband demodulator comprises:

an input port for receiving a serial data stream comprising a plurality of digital signal samples representing a plurality of QPSK-modulated DS0 telephony channels at baseband;

an automatic gain control (AGC) stage for adjusting the gain of the digital signal samples for each of the DS0 telephony channels;

a symbol timing recovery (STR) stage coupled to the AGC stage for extracting timing information for each of the QPSK-modulated DS0 telephony channels from the digital signal samples and delaying the sampling of the digital signal samples at a decoding stage to a time such that the sampling will be at optimized symbol instants;

a carrier phase recovery (CPR) stage coupled to the STR stage for locking the demodulator to the frequency of the carrier for each of the QPSK-modulated DS0 telephony signals; and a symbol decoding stage for sampling the digital signal samples and providing a digital signal output corresponding to the demodulated DS0 telephony channels.

3. The system of claim 1, wherein the broadband communication network is a cable television (CATV) network, wherein the selected carrier frequency is in a predetermined first band of frequencies, and further comprising equipment for providing television program signals to subscribers in a predetermined second band of frequencies.

4. The system of claim 3, further comprising:

a frequency agile modulator located at the subscriber operative to change the frequency at which telephony signals are communicated from a first frequency in the first band of frequencies to a second frequency in the first band of frequencies in response to a command received from a control device.

5. The system of claim 4, wherein the frequency agile modulator comprises a quadrature phase shift keying (QPSK) modulator operative at selectable carrier frequencies varying in discrete increments.

6. The system of claim 1, wherein said telephony network interface comprises a CATV headend.

7. A method of operating a broadband communication network, including a telephony network interface for connection to a telephony network, for communicating signals between subscribers and the telephony network, comprising the steps of:

receiving frequency division multiplexed (FDM) modulated telephony signals at the telephony network interface;

frequency shifting a selected plurality of FDM modulated telephony signals to baseband;

sampling the baseband-shifted telephony signals to generate a plurality of time division multiple access telephony signal samples;

channelizing the plurality of time division multiple access telephony signal samples into a serial data stream;

processing the serial data stream with a single digital signal processor to derive a plurality of demodulated telephony signals; and coupling the demodulated telephony signals to the telephony network.

8. The method of claim 7, wherein the modulated telephony signals are independently modulated on a carrier (with QPSK) in a band of the broadband network, and wherein the step of processing the serial data stream with a single digital signal processor to derive a plurality of demodulated telephony signals comprises:

sampling the selected subset of modulated telephony signals at a predetermined sampling rate to obtain a serial data stream of digital signal samples;

processing the digital signal samples (with a DSP) representing the selected subset of modulated information signals to derive a timing adjustment signal (b); and utilizing the timing adjustment signal to adjust the predetermined sampling rate.

9. An apparatus for the communication of telephony signals to and from a telephony network and to and from a plurality of subscribers of a subscription system including a subscription network having a first band of frequencies for communicating signals to subscribers in the subscription network and a second band of frequencies for communicating signals from the subscribers, comprising:

a telephony network modulator for modulating the telephony signals from the telephony network on said first band of said subscription network;

a subscriber terminal including a subscriber terminal demodulator for demodulating the telephony signals in the first band from the subscription network and coupling them to a subscriber;

a second modulator associated with each of said plurality of subscribers for modulating telephony signals from each subscriber in a selected frequency subband in the second band of the subscription network;

a frequency converter stage for converting a plurality of modulated telephony signals in the second band of the subscription network to a baseband frequency;

a signal processor for processing signals from said frequency converter stage and demodulating said signals to derive demodulated telephony signals associated with a plurality of DS0 channels; and a component for coupling the demodulated telephony signals to the telephony network.

10. A method of operating a communication system to couple telephony signals to and from a telephony network and to and from a plurality of subscribers of a subscription system including a tree-and-branch type broadband subscription network extending from a headend to the subscribers, comprising the steps of:

providing a network interface for telephony signals from the telephony network to the headend;

providing an interface for telephony signals from a subscriber to a subscriber terminal connected to the subscription network;

providing a first band of frequencies for communicating signals to subscribers from the headend;

modulating the telephony signals from the telephony network on the first band of the subscription network;

providing a second band of frequencies for communicating signals to the headend from subscribers;

translating a predetermined plurality of telephony signals from subscribers to a baseband frequency;

processing the predetermined plurality of telephony signals at baseband to derive demodulated telephony signals associated with a plurality of DS0 channels; and coupling the demodulated telephony signals to the telephony network at the network interface.

11. A communication signal demodulator for demodulating a plurality of independent QPSK-modulated DS0 telephony channels, comprising:

an input port for receiving a serial data stream comprising a plurality of digital signal samples representing a plurality of QPSK-modulated DS0 telephony channels at baseband;

an automatic gain control (AGC) stage for adjusting the gain of the digital signal samples for each of the independent DS0 telephony channels;

a symbol timing recovery (STR) stage coupled to the AGC stage for extracting timing information for each of the QPSK-modulated DS0 telephony channels from the digital signal samples and delaying the sampling of the digital signal samples at a decoding stage to a time such that the sampling will be at optimized symbol instants;

a carrier phase recovery stage coupled to the STR stage for locking the demodulator to the frequency of the carrier for each of the QPSK-modulated DS0 telephony signals; and a symbol decoding stage for sampling the digital signal samples and providing a digital signal output corresponding to the demodulated DS0 telephony channels.

12. A method for independently communicating a plurality of information signals on a broadband communication network, comprising the steps of:

independently modulating each one of a plurality of information signals on a carrier in a band of the broadband network;

at a receiver on the network, translating a selected subset of modulated information signals to baseband;

sampling the selected subset of modulated information signals at a predetermined sampling rate to obtain a serial data stream of digital signal samples;

processing the digital signal samples representing the selected subset of modulated information signals to derive a timing adjustment signal (b); and utilizing the timing adjustment signal to adjust the predetermined sampling rate.

13. The method of claim 12, wherein the information signals are modulated in QPSK.

14. The method of claim 12, wherein the processing of the digital signal samples is effected with a digital signal processor.

15. The method of claim 12, further comprising the step of automatically adjusting the gain of the modulated information signals with an automatic gain control (AGC) circuit prior to the step of sampling.

16. The method of claim 15, wherein the step of automatically adjusting the gain of the modulated information signals comprises:

multiplying each sample by a multiplication factor M prior to the step of deriving a timing adjustment signal; and periodically determining the multiplication factor M at predetermined intervals measured in symbol periods.

17. The method of claim 12, wherein the step of utilizing the timing adjustment signal to adjust the predetermined sampling rate comprises:

periodically determining the multiplication factor M at predetermined intervals measured in symbol periods.

18. The method of claim 12, wherein the information signals comprise DS0 telephony signals.

19. The method of claim 12, wherein the step of processing the digital signal samples to derive a timing adjustment signal comprises periodically determining the timing adjustment signal at predetermined intervals measured in symbol periods.

20. The method of claim 12, wherein the timing adjustment signal comprises a coefficient for a variable group delay filter.

21. The apparatus of claim 9, further comprising a digitizer for converting the modulated telephony signals to digital signal samples.

22. The apparatus of claim 21, wherein said frequency converter stage is a digital Fast Fourier Transform (FFT) component.

23. The apparatus of claim 21, wherein the signal processor is a digital signal processor.

* * * * *